(12) United States Patent
Lundahl et al.

(10) Patent No.: US 12,373,026 B2
(45) Date of Patent: Jul. 29, 2025

(54) EYE PROFILING

(71) Applicant: TOBII AB, Danderyd (SE)

(72) Inventors: Rickard Lundahl, Danderyd (SE); Shanker Keshavdas, Danderyd (SE); Jonas Sjöstrand, Danderyd (SE); Daniel Tornéus, Danderyd (SE); Johanna Frost, Stockholm (SE); Hanwei Wu, Stockholm (SE)

(73) Assignee: Tobii AB, Danderyd (SE)

( * ) Notice: Subject to any disclaimer, the term of this patent is extended or adjusted under 35 U.S.C. 154(b) by 201 days.

(21) Appl. No.: 18/206,660

(22) Filed: Jun. 7, 2023

(65) Prior Publication Data
US 2023/0400917 A1 Dec. 14, 2023

(30) Foreign Application Priority Data
Jun. 8, 2022 (SE) .................................. 2250689-3

(51) Int. Cl.
G06F 3/01 (2006.01)
G06T 7/73 (2017.01)

(52) U.S. Cl.
CPC ................ *G06F 3/013* (2013.01); *G06T 7/73* (2017.01); *G06T 2207/30201* (2013.01)

(58) Field of Classification Search
CPC . G06F 3/013; G06T 7/73; G06T 2207/30201; G06T 2207/10048;
(Continued)

(56) References Cited

U.S. PATENT DOCUMENTS 6,413,251 B1 * 7/2002 Williams ............ A61F 9/00817
606/4
7,401,920 B1 * 7/2008 Kranz ................ G02B 27/0093
382/117
(Continued)

FOREIGN PATENT DOCUMENTS

EP 2268192 1/2011
EP 3320830 5/2018
WO 202201587 1/2022

OTHER PUBLICATIONS

Swedish Search Report regarding SE App. No. 2250689-3, Dated Feb. 3, 2023.

*Primary Examiner* — Mohammed A Hasan
(74) *Attorney, Agent, or Firm* — Christopher Ignatius Moylan

(57) ABSTRACT

An eye tracking system comprising a processor configured to: receive a plurality of images of an eye from a camera, each image comprising an illuminated sub-region of a cornea of the eye, the illuminated sub-region comprising: a first corneal reflection of a first light source from a surface of the illuminated sub-region; and a second corneal reflection of a second light source from the surface of the illuminated sub-region; for each image, determine a three-dimensional, 3D, position of the first corneal reflection and a 3D position of the second corneal reflection based on a position of the camera, a position of the first light source, a position of the second light source, positions of the first and second corneal reflections in the image and a corneal surface model for the illuminated sub region; and output a topographical profile of the cornea based on the 3D positions determined for each image.

18 Claims, 11 Drawing Sheets

(58) Field of Classification Search
CPC ........... G06T 2207/30041; G06T 7/586; G06T 7/514; G06T 7/70; H04N 13/383; A61B 3/0025; A61B 3/107; A61B 3/158; G02B 27/0093
USPC ........................................................ 351/209
See application file for complete search history.

(56) References Cited

U.S. PATENT DOCUMENTS

| | | | |
|---|---|---|---|
| 8,077,914 B1* | 12/2011 | Kaplan | A61B 3/113 |
| | | | 382/103 |
| 8,824,779 B1 | 1/2014 | Smyth | |
| 10,108,261 B1* | 10/2018 | Hall | G06V 40/19 |
| 2007/0189742 A1 | 8/2007 | Knaan et al. | |
| 2010/0328444 A1* | 12/2010 | Blixt | A61B 3/145 |
| | | | 348/78 |
| 2017/0000336 A1 | 1/2017 | Ensing et al. | |
| 2017/0261610 A1 | 9/2017 | Scally et al. | |
| 2017/0263007 A1* | 9/2017 | Cavin | G06V 40/18 |
| 2019/0156100 A1* | 5/2019 | Rougeaux | G06V 40/161 |
| 2019/0235247 A1* | 8/2019 | Norden | G06F 3/013 |

* cited by examiner

EYE PROFILING

CROSS-REFERENCE TO RELATED APPLICATION

The present application claims priority to Swedish patent application No. 2250689-3, filed Jun. 8, 2022, entitled "EYE PROFILING", and is hereby incorporated by reference in its entirety.

FIELD

The present disclosure generally relates to the field of eye tracking. In particular, the present disclosure relates to processors, algorithms, eye tracking systems and methods for generating a representation of a cornea of an eye.

BACKGROUND

In eye tracking applications, digital images are retrieved of the eyes of a user and the digital images are analysed in order to estimate gaze direction of the user. The estimation of the gaze direction may be based on computer-based image analysis of features of the imaged eye. One known example method of eye tracking includes the use of infrared light and an image sensor. The infrared light is directed towards eye(s) of a user and the reflection of the light is captured by an image sensor.

Many eye tracking systems estimate gaze direction based on identification of a pupil position together with glints or corneal reflections in the digital images. However, gaze estimation techniques can suffer from errors due to assumptions about the shape and/or position of the features of the eye. Therefore, improving the accuracy of such feature determination can be important for eye tracking systems and methods.

Portable or wearable eye tracking devices have also been previously described. One such eye tracking system is described in U.S. Pat. No. 9,041,787 (which is hereby incorporated by reference in its entirety). A wearable eye tracking device is described using illuminators and image sensors for determining gaze direction.

SUMMARY

According to a first aspect of the present disclosure there is provided an eye tracking system comprising a processor configured to:
  receive a plurality of images of an eye from at least one camera, each image comprising a different illuminated sub-region of a corneal surface of the eye, the illuminated sub-region comprising:
    a first corneal reflection of a first light source from the illuminated sub-region; and
    a second corneal reflection of a second light source from the illuminated sub-region;
  for each image, determine a three-dimensional, 3D, position of the first corneal reflection and a 3D position of the second corneal reflection based on a position of the at least one camera, a position of the first light source, a position of the second light source, positions of the first and second corneal reflections in the image and a corneal surface model for the illuminated sub region; and
  output a topographical profile of the cornea based on the 3D positions of the first corneal reflection and the second corneal reflection determined for each image.

The processor may be configured to: for each image, estimate or determine an optical axis of the eye in the image; and output the topographical profile of the cornea based on the 3D positions of the first corneal reflection and the second corneal reflection, and the optical axis, determined for each image.

The processor may be configured to determine the 3D positions of the first corneal reflection and the 3D position of the second corneal reflection by adjusting the corneal surface model to reduce an error: in a ray tracing path from the camera to the first light source via the first corneal reflection projected on a surface of the corneal surface model; and in a ray tracing path from the camera to the second light source via the second corneal reflection projected on the surface of the corneal surface model.

The processor may be configured to: for each image: determine at least one first camera ray from the position of the respective at least one camera to the 3D position of the first corneal reflection by back-projecting the position of the first corneal reflection in the image; determine at least one second camera ray from the position of the respective at least one camera to the 3D position of the second corneal reflection by back-projecting the position of the second corneal reflection in the image; determine at least one first light source ray and at least one second light source ray based on a corresponding reflection of the at least one first camera ray and the at least one second camera ray from a surface of the corneal surface model; adjust the corneal surface model to reduce an error between: a direction of the at least one first light source ray and the position of the first light source; and a direction of the at least one second light source ray and the position of the second light source; and determine the 3D position of the first corneal reflection and the 3D position of the second corneal reflection based on the adjusted corneal surface model.

The surface of the corneal surface model may be a virtual surface.

The error may comprise: a displacement error representing a displacement of a first light source ray from a position of the first light source and a displacement of a second light source ray from a position of the second light source; or an angular error representing an angular error in the first light source ray and an angular error in the second light source ray.

The processor may be configured to adjust the corneal surface model until the error satisfies a threshold condition.

The corneal surface model for the illuminated sub region may comprise a polynomial surface model of the cornea. The processor may be configured to: for each image, adjust the corneal surface model by updating coefficients of the polynomial surface model of the cornea; and output the topographical profile of the cornea as the polynomial surface model.

The polynomial surface model may comprise a Zernike polynomial.

The processor may be configured to: estimate or determine an optical axis of the eye in the image; and determine the 3D position of the first corneal reflection and the 3D position of the second corneal reflection in a corneal coordinate system using the optical axis.

The corneal surface model for the illuminated sub region of each image may comprise a regional spherical model of the illuminated sub-region. The processor may be configured to: for each image, adjust the corneal surface model by adjusting a radius and/or a centre of a sphere of the regional spherical model.

The processor may be configured to: for each image: estimate or determine an optical axis of the eye in the image; transform the 3D position of the first corneal reflection and the 3D position of the second corneal reflection from a system coordinate system to a cornea coordinate system using the optical axis; and determine a first corneal height and a second corneal height corresponding to the 3D position of the respective first and second corneal reflections in the cornea coordinate system; and output the topographical profile of the cornea as a height map comprising the first corneal height and the second corneal height of each image.

The processor may be configured to determine the optical axis using a pupil centre corneal reflection algorithm.

The processor may be configured to receive the plurality of images as a first plurality of images from a first camera and a corresponding second plurality of images from a second camera spaced apart from the first camera. Each image in the first plurality of images and a corresponding image in the second plurality of images define an image pair capturing the same gaze angle of the eye. The illuminated sub region of each image may comprise a region encompassing the first and second corneal reflections of each image in the respective image pair.

The processor may be configured to: determine a first plane including the positions of the first camera, the first corneal reflection of the first image of the image pair and the first light source; determine a second plane including the positions of the first camera, the second corneal reflection of the first image of the image pair and the second light source; determine a first line of the centre of the local sphere as the intersection of the first plane and the second plane; determine a third plane including the positions of the second camera, the first corneal reflection of the second image of the image pair and the first light source; determine a fourth plane including the positions of the second camera, the second corneal reflection of the second image of the image pair and the second light source; determine a second line of the centre of the local sphere as the intersection of the third plane and the fourth plane; and determine the centre of the local sphere as the intersection, or the closest point of intersection, of the first line of the centre of the local sphere and the second line of the centre of the local sphere.

The plurality of images may comprise images of the eye having a range of different gaze directions or gaze angles.

The eye tracking system may be configured to provide instructions to a user to gaze in different directions while capturing the plurality of images.

The eye tracking system may be configured to instruct a user to follow stimulus on a display. The eye tracking system may comprise the display.

The processor may be configured to output instructions as visual or audio signals via one or more signal generators.

The eye tracking system may be configured to: receive a further image of the eye, the further image of the eye comprising a plurality of corneal reflections corresponding to a plurality of light sources; determine the 3D positions of the plurality of corneal reflections using the topographical profile of the cornea; determine a corneal centre based on the 3D positions of the plurality of corneal reflections; and determine a gaze of the eye/of a user based on the corneal centre.

According to a second aspect of the present disclosure there is provided a head-mounted device comprising any eye tracking system disclosed herein.

According to a third aspect of the present disclosure there is provided a method for determining a topographical profile of an eye, the method comprising:

receiving a plurality of images of an eye from at least one camera, each image comprising a different illuminated sub-region of a corneal surface of the eye, the illuminated sub-region comprising:
  a first corneal reflection of a first light source from the illuminated sub-region; and
  a second corneal reflection of a second light source from the illuminated sub-region;
for each image, determining a three-dimensional, 3D, position of the first corneal reflection and a 3D position of the second corneal reflection based on a position of the at least one camera, a position of the first light source, a position of the second light source, positions of the first and second corneal reflections in the image and a corneal surface model for the illuminated sub region; and
outputting a topographical profile of the cornea based on the 3D positions of the first corneal reflection and the second corneal reflection determined for each image.

There may be provided a computer program, which when run on a computer, causes the computer to configure any apparatus, including a circuit, processor, controller, converter, or device disclosed herein or perform any method disclosed herein. The computer program may be a software implementation, and the computer may be considered as any appropriate hardware, including a digital signal processor, a microprocessor, a microcontroller and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION

Figure 1:
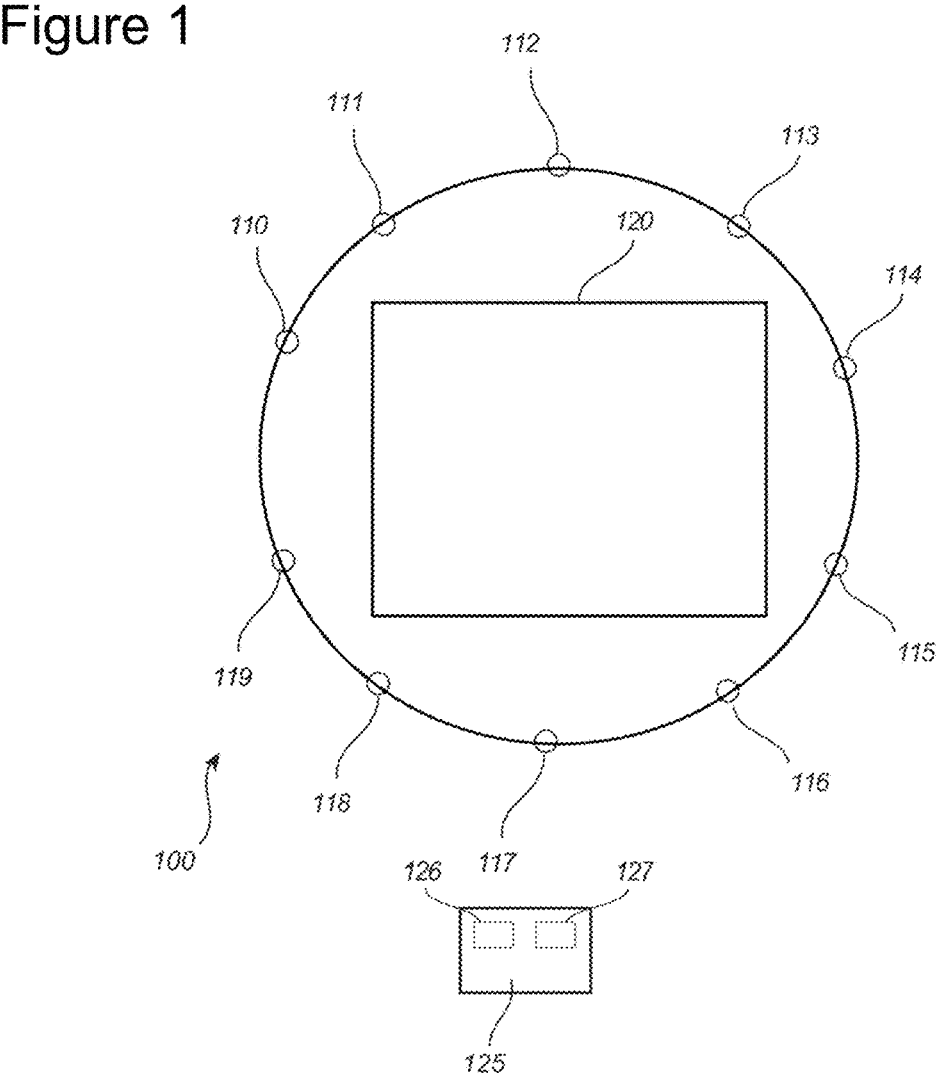
FIG. 1 shows a schematic view of an eye tracking system which may be used to capture a plurality of images that can be used by example embodiments of the present disclosure.

FIG. 1 shows a simplified view of an eye tracking system 100 (which may also be referred to as a gaze tracking system) in a head-mounted device in the form of a virtual or augmented reality (VR or AR) device or VR or AR glasses or anything related, such as extended reality (XR) or mixed reality (MR) headsets. The system 100 comprises an image sensor 120 (e.g., a camera) for capturing images of the eyes of the user. The system may optionally include one or more illuminators 110-119 (also referred to herein as light sources) for illuminating the eyes of a user, which may for example be light emitting diodes emitting light in the infrared frequency band, or in the near infrared frequency band and which may be physically arranged in a variety of configurations. The image sensor 120 may for example be an image sensor of any type, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor may be capable of converting light into digital signals. In one or more examples, it could be an Infrared image sensor or IR image sensor, an RGB sensor, an RGBW sensor or an RGB or RGBW sensor with IR filter.

The eye tracking system 100 may comprise circuitry or one or more processors 125, for example including a receiver 126 and processing circuitry 127, for receiving and processing the images captured by the image sensor 120. The circuitry 125 may for example be connected to the image sensor 120 and the optional one or more illuminators 110-119 via a wired or a wireless connection and be co-located with the image sensor 120 and the one or more illuminators 110-119 or located at a distance, e.g., in a different device. In another example, the circuitry 125 may be provided in one or more stacked layers below the light sensitive surface of the light sensor 120.

The eye tracking system 100 may include a display (not shown) for presenting information and/or visual stimuli to the user. The display may comprise a VR display which presents imagery and substantially blocks the user's view of the real-world or an AR display which presents imagery that is to be perceived as overlaid over the user's view of the real-world.

The location of the image sensor 120 for one eye in such a system 100 is generally away from the line of sight for the user in order not to obscure the display for that eye. This configuration may be, for example, enabled by means of so-called hot mirrors which reflect a portion of the light and allows the rest of the light to pass, e.g., infrared light is reflected, and visible light is allowed to pass.

While in the above example the images of the user's eye are captured by a head-mounted image sensor 120, in other examples the images may be captured by an image sensor that is not head-mounted. Such a non-head-mounted system may be referred to as a remote system.

In an eye tracking system, a gaze signal can be computed for each eye of the user (left and right). The quality of these gaze signals can be reduced by disturbances in the input images (such as image noise) and by incorrect algorithm behaviour (such as incorrect predictions). A goal of the eye tracking system is to deliver a gaze signal that is as good as possible, both in terms of accuracy (bias error) and precision (variance error). For many applications it can be sufficient to deliver only one gaze signal per time instance, rather than both the gaze of the left and right eyes individually. Further, the combined gaze signal can be provided in combination with the left and right signals. Such a gaze signal can be referred to as a combined gaze signal.

Figure 2:
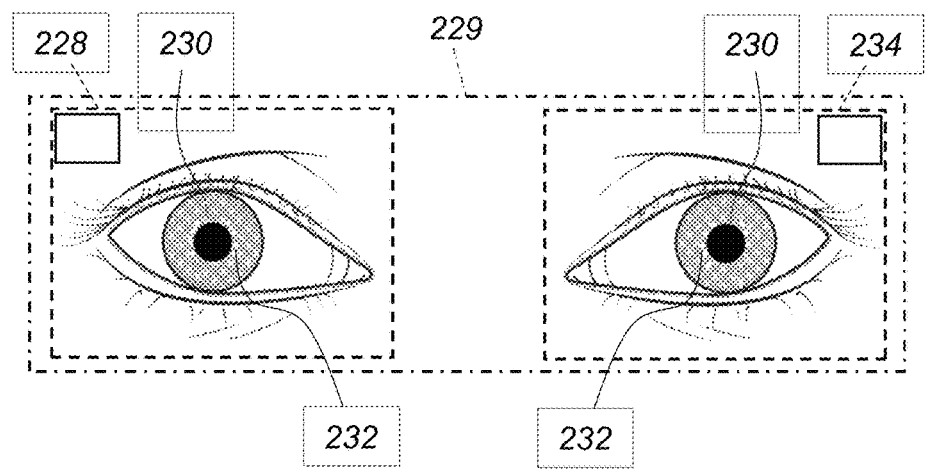
FIG. 2 shows an example image of a pair of eyes.

FIG. 2 shows a simplified example of an image 229 of a pair of eyes, captured by an eye tracking system such as the system of FIG. 1. The image 229 can be considered as including a right-eye-image 228, of a person's right eye, and a left-eye-image 234, of the person's left eye. In this example the right-eye-image 228 and the left-eye-image 234 are both parts of a larger image of both of the person's eyes. In other examples, separate image sensors may be used to acquire the right-eye-image 228 and the left-eye-image 234. In other examples, multiple image sensors may be used to acquire images capturing both eyes.

The system may employ image processing (such as digital image processing) for extracting features in the image. The system may for example identify a position of the pupil 230 in the one or more images captured by the image sensor. The system may determine the position of the pupil 230 using a pupil detection process. The system may also identify corneal reflections 232 located in close proximity to the pupil 230. The system may estimate a corneal centre based on the corneal reflections 232. For example, the system may match each of the individual corneal reflections 232 for each eye with a corresponding illuminator and determine the corneal centre of each eye based on the matching. To a first approximation, the eye tracking system may determine an optical axis of the eye of the user as the vector passing through a centre of the pupil 230 and the corneal centre. The direction of gaze corresponds to the axis from the fovea of the eye through the centre of the pupil (visual axis). The angle between the optical axis and the gaze direction is the foveal offset, which typically varies from user to user and is in the range of a few degrees. The eye tracking system may perform a calibration procedure, instructing the user to gaze in a series of predetermined directions (e.g., via instructions on a screen), to determine the fovea offset. The determination of the optical axis described above is known to those skilled in the art and often referred to as pupil centre corneal reflection (PCCR). PCCR is not discussed in further detail here.

Eye-tracking systems employing PCCR typically use a standard model of the cornea surface, in its simplest form a sphere. However, even in eyes classified as normal, the cornea surface tends to vary radially and angularly from the cornea vertex. The cornea can include ridges and other structures in about ⅓ of the eyes of the human population. A known spheroid model does not capture such variations and can lead to errors in determining the corneal centre and ultimately a user's gaze. For eyes with astigmatism, corneal astigmatism is the most common variant and is caused by imperfections in the corneal curvature. Corneal astigmatism can result in further significant radial and angular variations.

The disclosed eye tracking systems and methods provide a personalised corneal topography model/profile for a user that can capture curvature and other variations from a standard corneal model. The personalised topography profile enables the eye tracking system to determine cornea position/centre from glint positions with increased accuracy resulting in improved determination of user gaze. The more accurate topography can also improve determination of absolute pupil position and/or entrance pupil position by providing a more detailed representation of how a ray is refracted through the cornea anterior surface at a certain location on the surface (more accurate surface normal).

Figure 3:
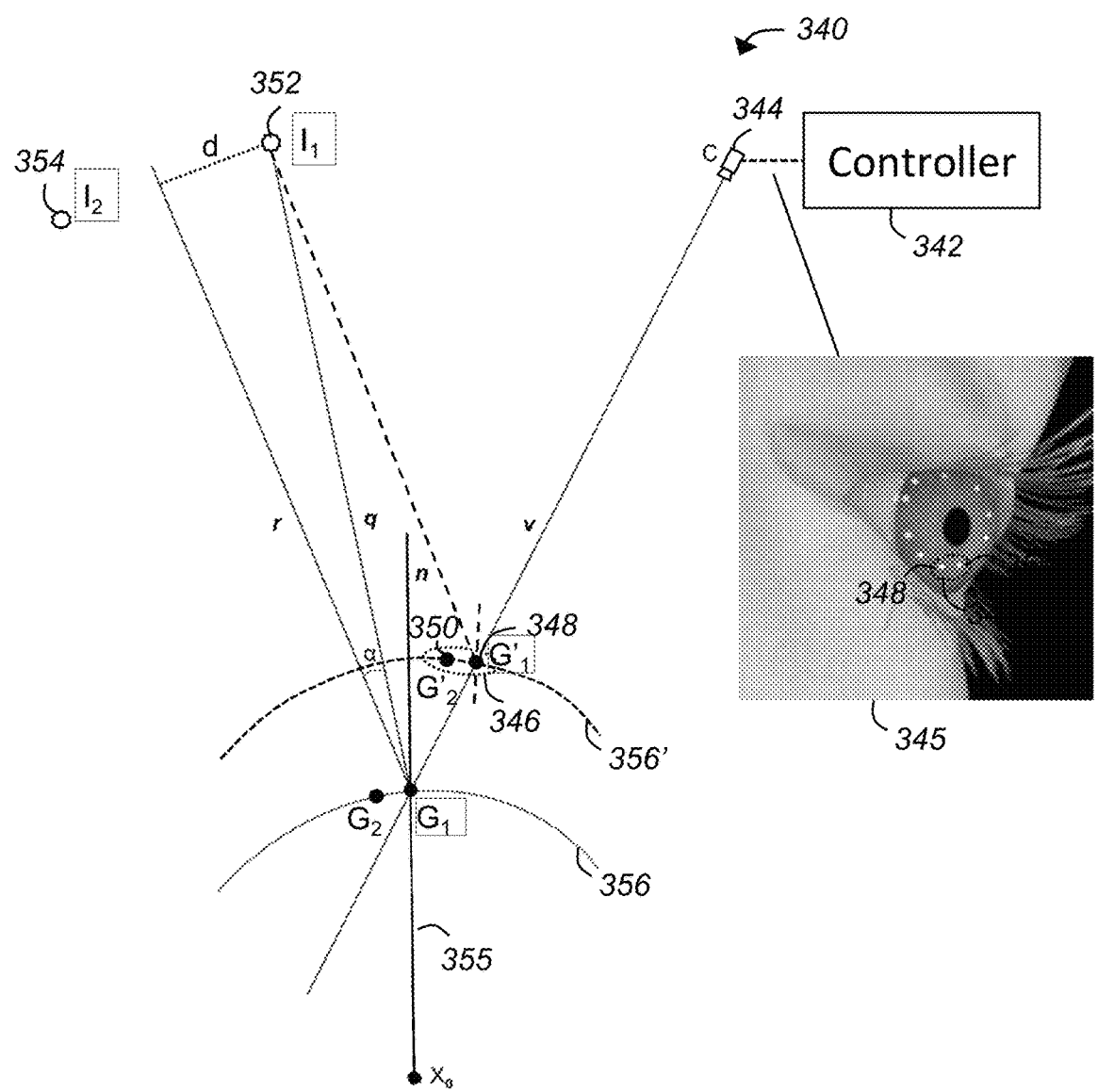
FIG. 3 illustrates a diagrammatic setup for an eye tracking system according to an embodiment of the present disclosure.

FIG. 3 illustrates a diagrammatic setup for an eye tracking system 340 according to an embodiment of the present disclosure.

The eye tracking system 340 comprises a processor 342. The processor receives a plurality of images of an eye from a camera, 344. Each image 345 (an example of which is illustrated in the Figure insert) comprises a different illuminated sub-region 346 of a corneal surface of the eye, each illuminated sub-region including a first corneal reflection 348 and a second corneal reflection 350. The first corneal reflection 348 originates from a reflection of a first light source 352 from the illuminated sub region 346 and the second corneal reflection 350 originates from a reflection of a second light source 354 from the illuminated sub region 346. The corneal reflections 348, 350, also referred to as glints, are the (specular) reflections of the first and second light sources 352, 354 on the cornea surface of the eye. For each image 345, the processor 342 determines a (true) three-dimensional (3D) position, $G'_1$, of the first corneal reflection 348 and a (true) 3D position, $G'_2$, of the second corneal reflection 350. As discussed in detail below, the processor 342 determines the 3D positions, $G'_1$, $G'_2$, based on a position, C, of the camera, a position, $I_1$, of the first light source, a position, $I_2$, of the second light source, positions of the first and second corneal reflections 348, 350 in the image 345 and a corneal surface model for the illuminated sub region. The processor 342 outputs a topographical profile of the cornea based on the 3D positions, $G'_1$, $G'_2$, of the first corneal reflection 348 and the second corneal reflection 350 determined for each image 345.

The plurality of images may comprise images of the eye having a range of different gaze directions or gaze angles. The plurality of images may comprise a sequence of images. By rotating the eyes over the plurality of images, the first and second corneal reflections 348, 350 define different illuminated sub-regions of the cornea. In this way, the processor 342 can generate the topographical profile based on the 3D positions of the first and second corneal reflections 348, 350 for different positions of the eye.

The disclosed system can calculate a topographical profile of the cornea by estimating 3D positions of the corneal reflections 348, 350 across several images. In each image 345, the locations of these reflections on the cornea provides information about that portion of the cornea. Movement of the eye across several images, and the related movement of the corneal reflections 348, 350 over the cornea surface provides the mapping of the corneal surface.

In some examples, the eye tracking system 340 may instruct a user to gaze in different directions while capturing the plurality of images such that the plurality of images capture a range of different gaze directions, and the system maps a large or full extent of the cornea. In some examples the system 340 may instruct the user may to follow a fixed pattern of eye movement, by for example following a stimulus on a screen. The stimulus may comprise a pattern that covers a full range of motion of the eye or at least a range of motion of the cornea to capture a topographical profile of the cornea. For example, the stimulus may include a spiral stimulus pattern starting from looking straight ahead and moving outwards or a random stimulus pattern moving between extremes of eye viewing angles.

In some examples, the processor 342 may determine the 3D positions, $G'_1$, $G'_2$, by adjusting a surface 356 of a corneal surface model for the illuminated sub-region to reduce an error ($\alpha$) in a ray tracing path (v, r) from the camera 344 to the first light source 352 via the first corneal reflection 348 projected on the surface, and a ray tracing path (not shown) from the camera 344 to the second light source 354 via the second corneal reflection 350, projected on the surface.

In some examples, for each image, the processor 342 may determine a first camera ray, v, from the position, C, of the camera to the 3D position, $G'_1$, of the first corneal reflection 348 by back-projecting the position of the first corneal reflection 348 in the image 345. It will be appreciated that the actual 3D position, $G'_1$, is initially unknown other than it lies on the first camera ray, v. Back-projection is known in the art and enables a transformation from two-dimensional image coordinates to a line vector emanating from the position of the camera. The processor may similarly determine a second camera ray (not shown) from the position, C, of the camera 344 to the 3D position, $G'_2$, of the second corneal reflection 350 by back-projecting the position of the second corneal reflection 350 in the image 345.

The processor 342 may determine a first light source ray, r, by reflecting the first camera ray, v, from a surface 356 of the corneal surface model using the law of reflection. To achieve this, the processor 342 may determine the intersection of the surface 356 with the first camera ray, v, to define a 3D position estimate, $G_1$, of the of the first corneal reflection 348. The processor 348 may determine a first surface normal 355 of the surface 356 at the 3D position estimate, $G_1$, of the first corneal reflection 348. The processor 348 may then apply the law of reflection to determine the first light source ray, r, extending from the 3D position estimate $G_1$. In a similar manner, the processor 342 may determine a second light source ray (not shown) by reflecting the second camera ray (not shown) from a surface 356 of the corneal surface model using the law of reflection. To achieve this, the processor 342 may determine the intersection of the surface 356 with the second camera ray to define a 3D position estimate, $G_2$, of the second corneal reflection 350. The processor 348 may then apply the law of reflection to determine the second light source ray extending from the 3D position estimate $G_2$.

The example of FIG. 3 shows how the surface 356 of the corneal surface model will affect the calculated 3D position estimate, $G_1$, $G_2$, of the first and second corneal reflections 348, 350. In this example, the surface is modelled as a surface of a local sphere (discussed in detail below). The surface 356 may be considered as a surface estimate 356. In this example, the local sphere has a smaller radius than the ground truth and the surface estimate 356 is not an accurate representation of the cornea surface for the illuminated sub region 346. As a result of the inaccurate representation, the 3D position estimates, $G_1$, $G_2$, are further away from the light sources 352, 354 and camera 344 than the true 3D positions, $G'_1$, $G'_2$. As a result, there is an error in the first light source ray, r, and the second light source ray and they do not impinge on the corresponding positions, $I_1$, $I_2$, of the first and second light sources 352, 354. An error in the surface 356 translates into an error in the 3D position estimates and an error in the first and second light source rays. The error can be calculated based on an angular deviation (shown as α in the figure for the first light source ray) of the first and second light source rays to a respective line from the respective 3D position estimate, $G_1$, $G_2$, to the respective first and second light source 352, 354 (shown as q in the figure for the line between $G_1$ and $I_1$). Alternatively, the error may be calculated based on a shortest distance, d, between the first and second light source ray and the position, $I_1$, $I_2$, of the respective first and second light source 352, 354. The error may be a combined error of the individual first and second light source rays.

The processor 342 may adjust the surface 356 of the corneal surface model to reduce the error in the light source rays and, as a result, reduce the error in the 3D position estimates, $G_1$, $G_2$. Following adjustment, a refined surface 356' of the corneal surface model may accurately represent the shape of the cornea in the illuminated sub region 346. The intersection of the first and second camera rays with the refined surface 356' define the (true) 3D positions, $G'_1$, $G'_2$, of the first and second corneal reflections 348, 350.

The processor 342 may adjust the corneal surface model until the refined surface 356' results in an error in the light source ray that satisfies a threshold condition. The adjustment may be performed by an optimisation algorithm as known in the art (e.g., hill descent, Nelder-Mead etc). For example, an objective function may define the ray tracing and operate on the first and second camera rays, the first and second light source rays, and the surface 356 to provide an error value. In the same way, the objective function may operate on the position, C, of the camera, the position, $I_1$, of the first light source, the position, $I_2$, of the second light source, the positions of the first and second corneal reflections 348, 350 in the image 345 and the corneal surface model for the illuminated sub region, to output the error value. The processor 342 may iteratively adjust (optimise) the definition of the surface 356 of the corneal surface model until the error value satisfies a threshold condition. The threshold condition may relate to one or more known optimisation termination conditions such as the error value falling below a threshold value or a gradient of the error value falling below a threshold value.

In some examples, the eye tracking system 340 may comprise the camera 344 and the first and second light sources 352, 354. In some examples, the first and second light sources 352, 354 may be positioned within a threshold distance of each other such that the first and second corneal reflections 348, 350 are within a threshold separation in the illuminated sub-region 346. Closely spaced first and second corneal reflections 348, 350 can enable the assumption of a constant curvature within the illuminated sub-region 346. As a result, the corneal surface model for the illuminated sub-region 346 may comprise a regional spherical model of the illuminated sub-region 346, as discussed further below. In addition, the accuracy and resolution of the topographical profile can be improved.

In some examples, each image may comprise a further illuminated sub-region having a further pair of corneal reflections (e.g., a third and fourth corneal reflection) from a corresponding pair of further light sources (e.g., a third and fourth light source). The eye tracking system may process each further pair of corneal reflections in the same way as described for the first and second corneal reflections. In other words, the light sources and corresponding corneal reflections are considered two at a time for each image 345. The eye tracking system may comprise the further light sources. As an example, the eye tracking system may comprise ten light sources (see FIG. 1) and the processor 342 may process pairs of corneal reflections made from combinations of closely spaced light sources/reflections, in the same way as described for the first and second corneal reflections 348, 350. In this way, further surface information can be obtained from each image. The light sources may be positioned based on the number of light sources to cover as much of the cornea as possible during nominal eye movement.

Figure 4:
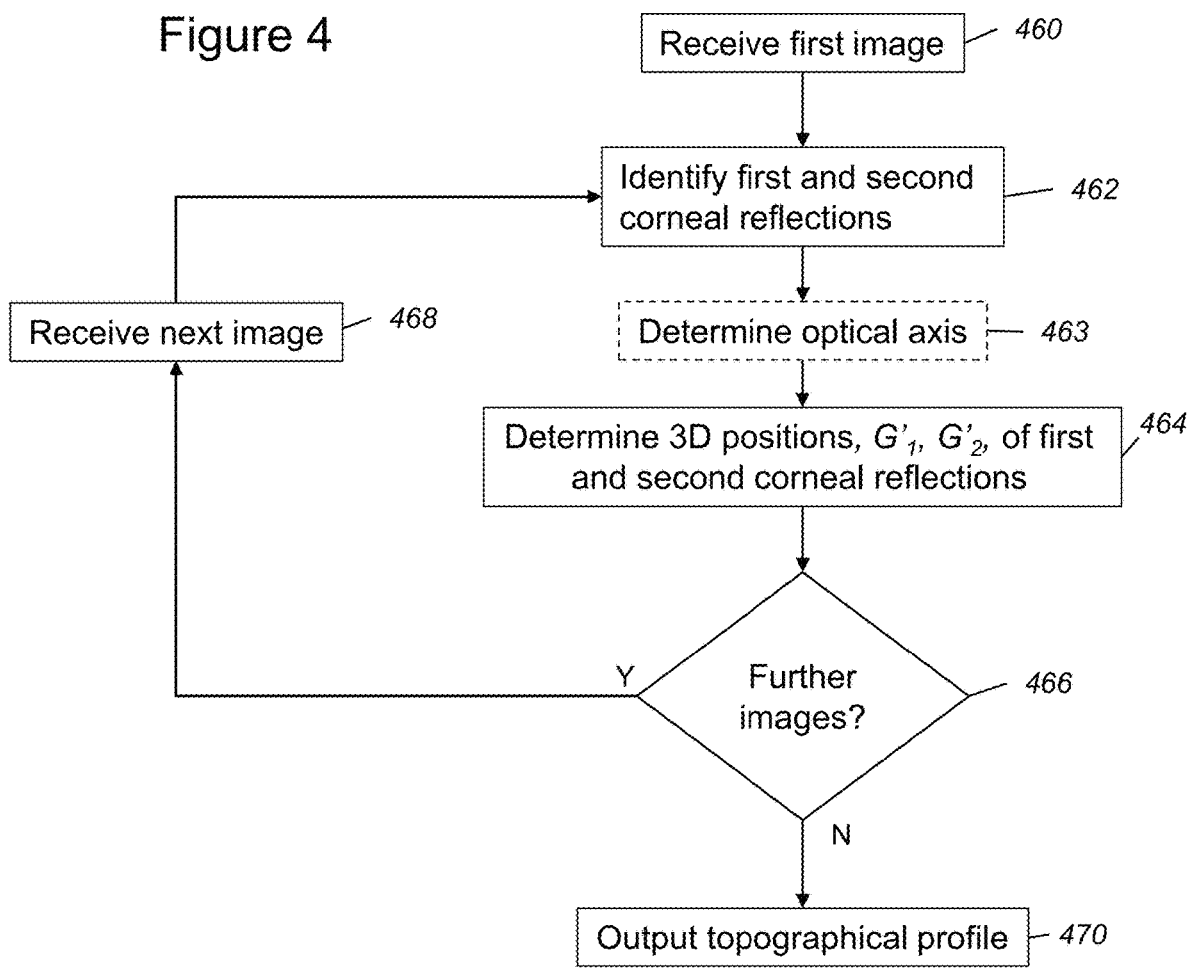
FIG. 4 illustrates a method of determining a topographical corneal profile according to an embodiment of the present disclosure.

FIG. 4 illustrates a flow diagram for a method of determining a topographical corneal profile according to an embodiment of the present disclosure. The method will be discussed with continuing reference to the system 340 of FIG. 3.

A first step 460 of the method comprises receiving a first image 345 of the plurality of images. A second step 462 comprises identifying the first and second corneal reflections 348, 350 defining the illuminated sub-region of the first image 345. A third optional step 463 comprises determining an optical axis of the eye in the first image 345. The processor may determine the optical axis using known methods such as PCCR as described below. A fourth step 464 comprises determining the 3D positions, $G'_1$, $G'_2$, of the first and second corneal reflections based on the position, C, of the camera, the position, $I_1$, of the first light source, the position, $I_2$, of the second light source, the positions of the first and second corneal reflections 348, 350 in the image 345 and the corneal surface model for the illuminated sub region. Decision point 466 determines whether there are further images in the plurality of images. If there are further images, the method proceeds to step 468 and receives the next image in the plurality of images and performs steps 462 to 464 on the next image. Once there are no further images, the method proceeds to step 470 and outputs a topographical profile of the cornea based on the 3D positions of the first and second corneal reflections determined for each image 345. In some examples, the processor 342 may output the topographical profile of the cornea based on the 3D positions of the first corneal reflection and the second corneal reflection, and the optical axis, determined for each image in optional step 463. As described in more detail below, the processor 342 may use the optical axis to add the 3D positions $G'_1$, $G'_2$, to a relevant portion of the topographical profile. This may be achieved in a number of ways, for example by transforming the determined 3D positions $G'_1$, $G'_2$, from a system coordinate system to a cornea coordinate system using the optical axis or by transforming the position of the camera and light sources from the system coordinate system to the cornea coordinate system, using the optical axis, and performing ray tracing in the cornea coordinate system.

Figure 5:
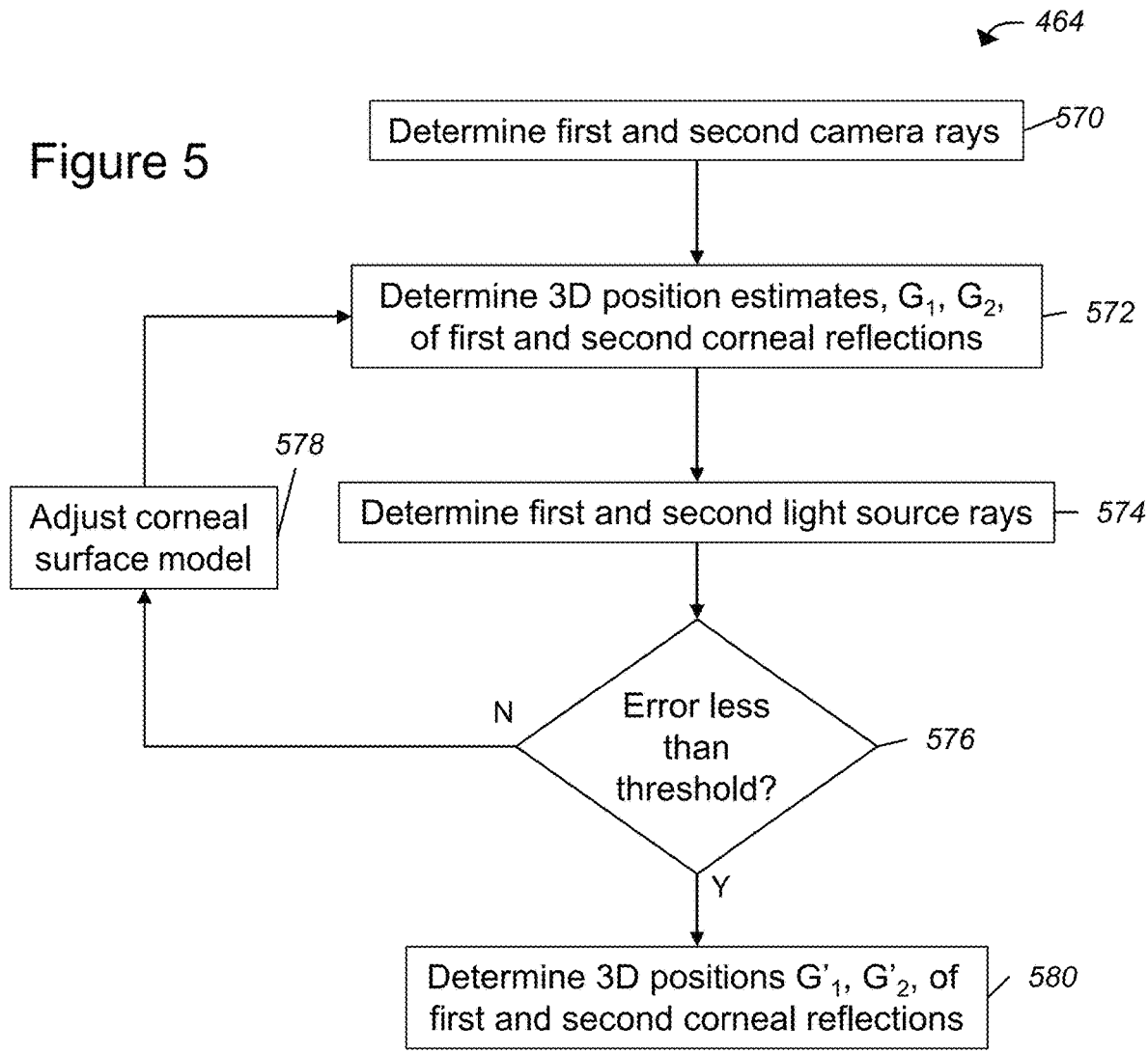
FIG. 5 illustrates a method of determining 3D positions of corneal reflections, a particular sub-step of the method of FIG. 4, according to an embodiment of the present disclosure.

FIG. 5 illustrates a method of performing step 464 of the method of FIG. 4 according to an embodiment of the present disclosure. The method will be discussed with continuing reference to the system 340 of FIG. 3.

A first step 570 of the method comprises determining the first and second camera rays by back-projecting the position of the first and second corneal reflections 348, 350 in the image 345. A second step 572 comprises determining the 3D position estimates, $G_1$, $G_2$, of first and second corneal reflections 348, 350 as the intersection points between the surface 356 and the respective first and second camera rays. A third step 574 comprises determining the first and second light source rays by reflecting the first and second camera rays from the surface 356 at the respective 3D position estimate, $G_1$, $G_2$ (using the law of reflection). A decision point 576 determines whether an error between the first and second light source rays and the respective positions of the first and second light sources 352, 354 is less than a threshold value. If the error is not less than the threshold value, the method proceeds to step 578 and adjusts the corneal surface model before repeating steps 572 to 576. The loop from 572, 574, 576, 578 may be performed as an optimisation algorithm that minimises the error, as described above. Once the error is less than the threshold value, the method proceeds to step 580 and determines the 3D positions, $G'_1$, $G'_2$, of the first and second corneal reflections 348, 350 as the (most recent values of) the 3D position estimates, $G_1$, $G_2$.

In some examples (such as the illustration of FIG. 3), the corneal surface model for the illuminated sub-region 346 of each image 345 comprises a regional spherical model of the illuminated sub-region 346. In other words, the illuminated subregion is modelled as a (small) portion of a surface of a local sphere. Adjusting 578 the corneal surface model may comprise adjusting a centre and/or radius of a local sphere of the regional spherical model. It will be appreciated that this local sphere only relates to a spherical approximation of the illuminated sub-region 346. The local sphere is not the same as a (global) cornea sphere representing the whole cornea, which may be used for determining the optical axis of the eye in a particular image, e.g., using PCCR (discussed below).

Figure 6:
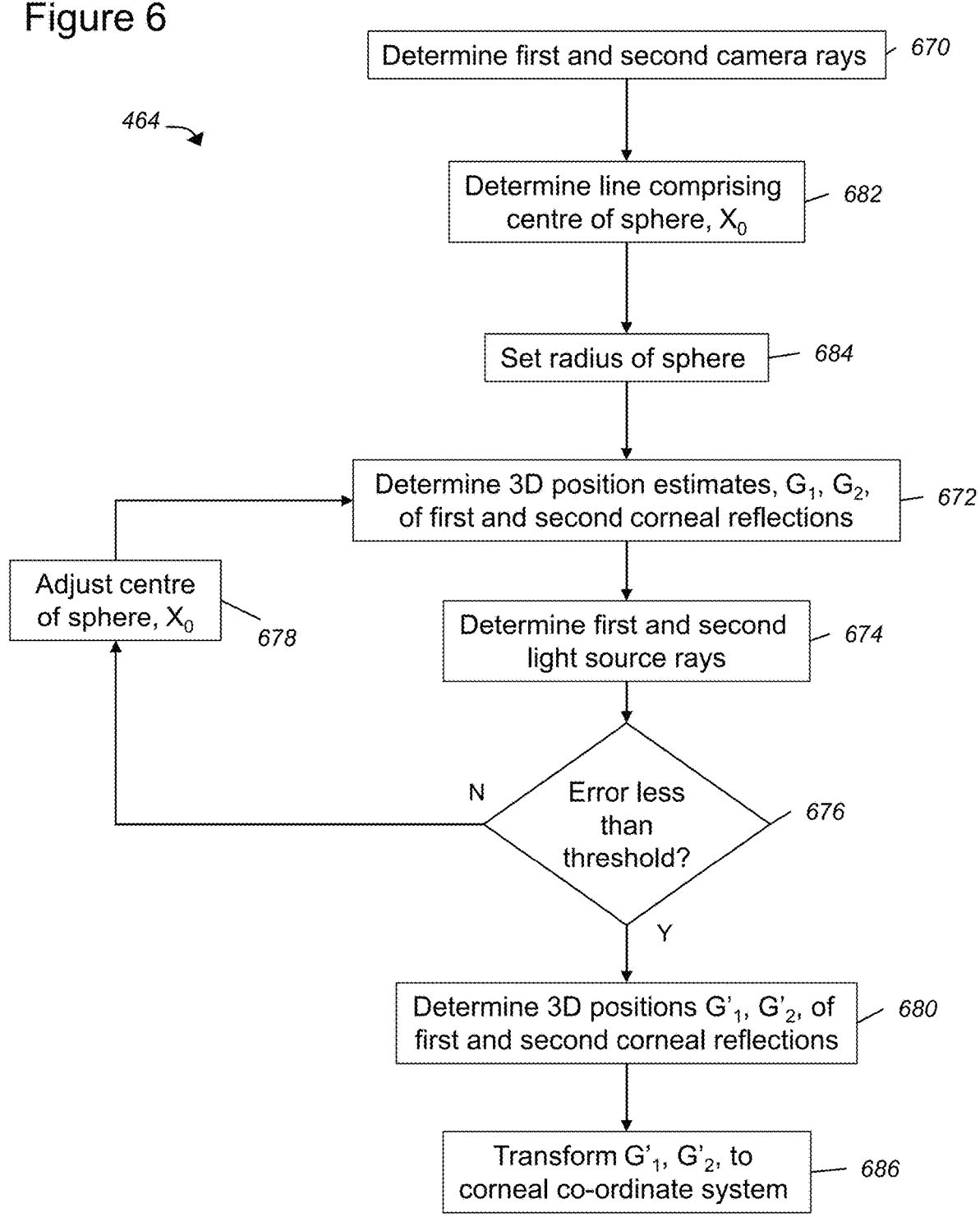
FIG. 6 illustrates a further method of determining 3D positions of corneal reflections, a particular sub-step of the method of FIG. 4, according to an embodiment of the present disclosure in which a corneal surface model comprises a regional spherical model.

FIG. 6 illustrates a method of performing step 464 of the method of FIG. 4 according to an embodiment of the present disclosure in which the corneal surface model comprises a regional spherical model. The method will be discussed with continuing reference to the system 340 of FIG. 3.

A first step 670 of the method comprises determining the first and second camera rays in the same way as described above. A second step 672 comprises determining a line on which the centre of the local sphere (indicated as $X_0$ in FIG. 3) of the regional spherical model lies. It can be assumed that the first and second corneal reflections 348, 350 lie on the surface 356 of the local sphere. As a result, the camera 344, the first corneal reflection 348, the first light source 352 and the centre, $X_0$, of the local sphere lie on a first plane and the camera 344, the second corneal reflection 350, the second light source 354 and the centre, $X_0$, of the local sphere lie on a second plane. Therefore, the centre, $X_0$, of the local sphere lies on the line of intersection of the first plane and the second plane. Therefore, the processor 342 may: determine a first plane including the positions of the camera 344, the first corneal reflection 348 and the first light source 352; determine a second plane including the positions of the camera 344, the second corneal reflection 350 and the second light source 354; and determine the line of the centre, $X_0$, of the local sphere as the intersection of the first plane and the second plane.

A third step 684 comprises setting a radius of the local sphere. The radius of the local sphere may be set based on a standard (average) cornea model for the general population and the position of the first and second corneal reflections 348, 350 (or illuminated sub-region 346) relative to a vertex of the cornea or a centre of the pupil. The position of the illuminated sub-region 346 relative to the vertex or pupil centre may be determined using PCCR or other known image analysis. If the illuminated sub-region 346 is an area of low curvature according to the standard model, the processor 342 can select a relatively large radius of the local sphere. If the illuminated sub-region 346 is an area of high curvature according to the standard model, the processor 342 can select a relatively small radius of the local sphere.

A fourth step 672 comprises determining 3D position estimates, $G_1$, $G_2$, of the first and second corneal reflections 348, 350 as the intersection of the first and second camera rays with the surface 356 of the local sphere. A fifth step 674 comprises determining the first and second light source rays by reflecting the first and second camera rays from the surface 356 of the local sphere at the respective 3D position estimate, $G_1$, $G_2$ (using the law of reflection). As part of determining the first and second light source rays, the processor 342 may calculate first and second surface normals to the surface 356 of the local sphere at the respective first and second 3D position estimates $G_1$, $G_2$. A decision point 676 determines whether an error between the first and second light source rays and the respective positions of the first and second light sources 352, 354 is less than a threshold value. If the error is not less than the threshold value, the method proceeds to step 678 and adjusts the position of the centre, $X_0$, of the local sphere along the line of intersection of the first plane and the second plane, before repeating steps 672 to 676. The loop from 672, 674, 676, 678 may be performed as an optimisation algorithm that minimises the error, as described above. Once the error is less than the threshold value, the method proceeds to step 680 and determines the 3D positions, $G'_1$, $G'_2$, of the first and second corneal reflections 348, 350 as the (most recent values of) the 3D position estimates, $G_1$, $G_2$.

In this regional spherical model example, the 3D positions, $G'_1$, $G'_2$, output at step 680 (along with all other positions and rays) are in a system or world coordinate system. Therefore, the method further includes a seventh step 686 of transforming the 3D positions $G'_1$, $G'_2$, of the first and second corneal reflections 348, 350 from the system coordinate system to a corneal coordinate system.

In some examples, the processor 342 may perform the transformation by first determining an optical axis (or optical direction) of the eye in the image 345 (step 463). As described herein, the optical axis may include the corneal centre and a unit vector representing a direction from the corneal centre to the pupil centre. The processor 342 may determine the optical axis using PCCR or other known techniques. For example, with a known position and pose of all cameras and light sources, the processor 342 may determine the optical axis by approximating the corneal centre and the pupil centre and defining the optical axis as the line segment joining the two centres. The processor 342 may compute the corneal centre for each image 345 by assuming a spherical cornea and using the technique disclosed in U.S. patent application Ser. No. 10/535,227 which is hereby incorporated by reference in its entirety. The processor 342 may apply a pupil regressor algorithm trained on annotated images of the pupil as seen from the camera 344 to find the pupil centre in each image 345. In examples with two cameras, discussed further below, the processor 345 may determine the 3D position of the pupil centre using stereo triangulation. In some examples, the optical axis of the eye may be defined as the axis [0,0,1] in the cornea coordinate system. The processor 342 may determine a transformation matrix, defining a transformation from the system coordinate system to the cornea coordinate system, based on the transformation required to transform the optical axis from its system coordinates to [0,0,1] or another predefined axis. The processor 342 may then transform the 3D positions to the cornea coordinate system using the transformation matrix.

In some examples, the processor 342 may perform the transformation from the system coordinate system to the corneal coordinate system without first determining the optical axis. In such examples, the processor 342 may determine the 3D position of the pupil centre as described above. As the optical axis is the line from the corneal centre to the pupil centre, we have a one point on the line for each image 345, with the other point being the corneal centre. For determining the cornea centre, a spherical shape can be crudely assumed for the (whole) cornea. The processor 342 may determine a (moving) corneal centre and a corneal radius (fixed for all images) of this global cornea sphere using an optimisation algorithm by minimising the distance between the 3D positions, $G'_1$, $G'_2$, of the corneal reflections and the surface of the global corneal sphere for every image. Note the global cornea sphere is different to the local sphere of the regional spherical model for the illuminated region 346 described above because the radius is fixed across all images and the optimisation is performed for the 3D positions, $G'_1$, $G'_2$, across all images 345. The centre of the global corneal sphere and the optical axis in each frame provides the local cornea coordinate system. The processor can then transform the 3D positions, $G'_1$, $G'_2$, of the corneal reflections 348, 350 in each image to the cornea coordinate system as described above.

Returning briefly to FIG. 4, for the regional spherical model, following transformation, the processor 342 may output the topographical profile of the cornea as a height map comprising a plurality of first and second corneal heights corresponding to the z-axis values of the 3D positions, $G'_1$, $G'_2$, in the corneal coordinate system for each image.

Figure 7:
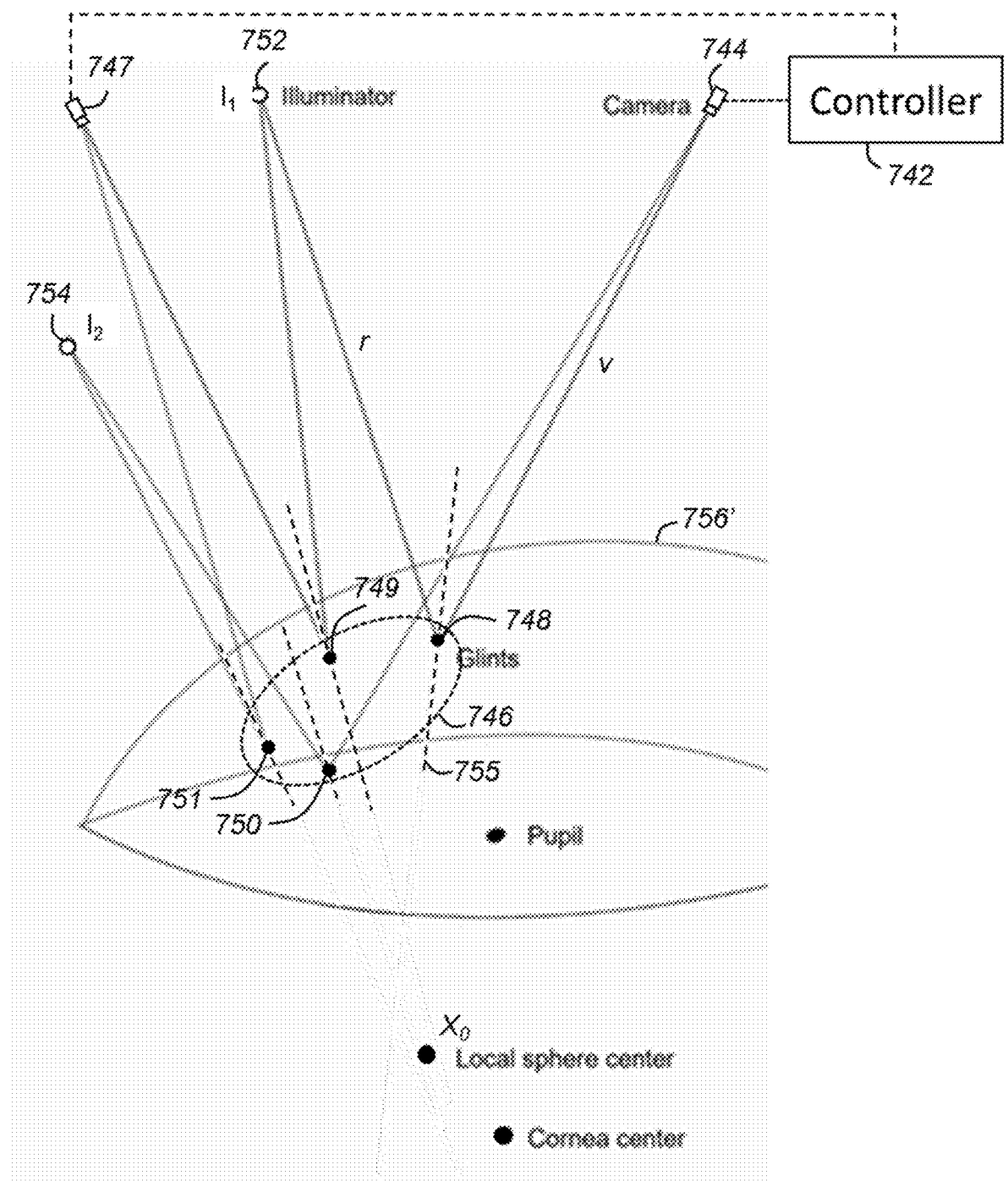
FIG. 7 illustrates a diagrammatic setup of a further eye tracking system according to an embodiment of the present disclosure.

In some examples, the processor 342 may receive the plurality of images from a first camera and a second camera spaced apart from the first camera. FIG. 7 illustrates a diagrammatic setup of such an eye tracking system 740 according to an embodiment of the present disclosure. Features of FIG. 7 that are also present in FIG. 3 have been given corresponding numbers in the 700 series and are not necessarily described again here.

The eye tracking system 740 is substantially the same as the eye tracking system of FIG. 3, other than the processor 742 receives the plurality of images as a first plurality of images from a first camera 744 and a corresponding second plurality of images from a second camera 747, spaced apart from the first camera 744. Each image in the first plurality of images has a corresponding image in the second plurality of images captured at (substantially) the same point in time. Each of the corresponding images define an image pair. Each image pair comprises a total of four corneal reflections—a first corneal reflection 748 (from the first light source 752) in the first image of the image pair; a second corneal reflection 750 (from the second light source 754) in the first image; a first corneal reflection 749 (from the first light source 752) in the second image of the image pair; and a second corneal reflection 751 (from the second light source 754) in the second image. The processor 742 can utilise the additional information provided by the extra corneal reflections and/or the stereoscopic nature of the spaced apart cameras to provide a more accurate topography. For example, as described below in relation to FIG. 8, for regional spherical model examples, the processor 742 can determine the centre, $X_0$, of the local sphere more precisely using the stereoscopic properties of the two cameras. As a result, the radius of the local sphere can be the adjusted to minimise the error. Therefore, the radius is no longer set based on a standard model and more accurate topographical profiles can be obtained for two camera embodiments.

The first and second camera 744, 747 may be positioned to maximize a possibility of seeing the first and second corneal reflections from the first and second light sources 752, 754 in both cameras 744, 747 for the same image pair (same eye position). In some examples, the spacing between the two cameras 744, 747, may be greater than a minimum spacing threshold. Providing a minimum spacing can ensure sufficient stereo information is provided to accurately determine the centre, $X_0$, of the local sphere. However, the cameras 744, 747 may also be kept within a maximum camera spacing threshold. This avoids the corneal reflections being absent or distorted/elongated (such that their centre positions cannot be accurately determined) in one or both images of the image pair.

Figure 8:
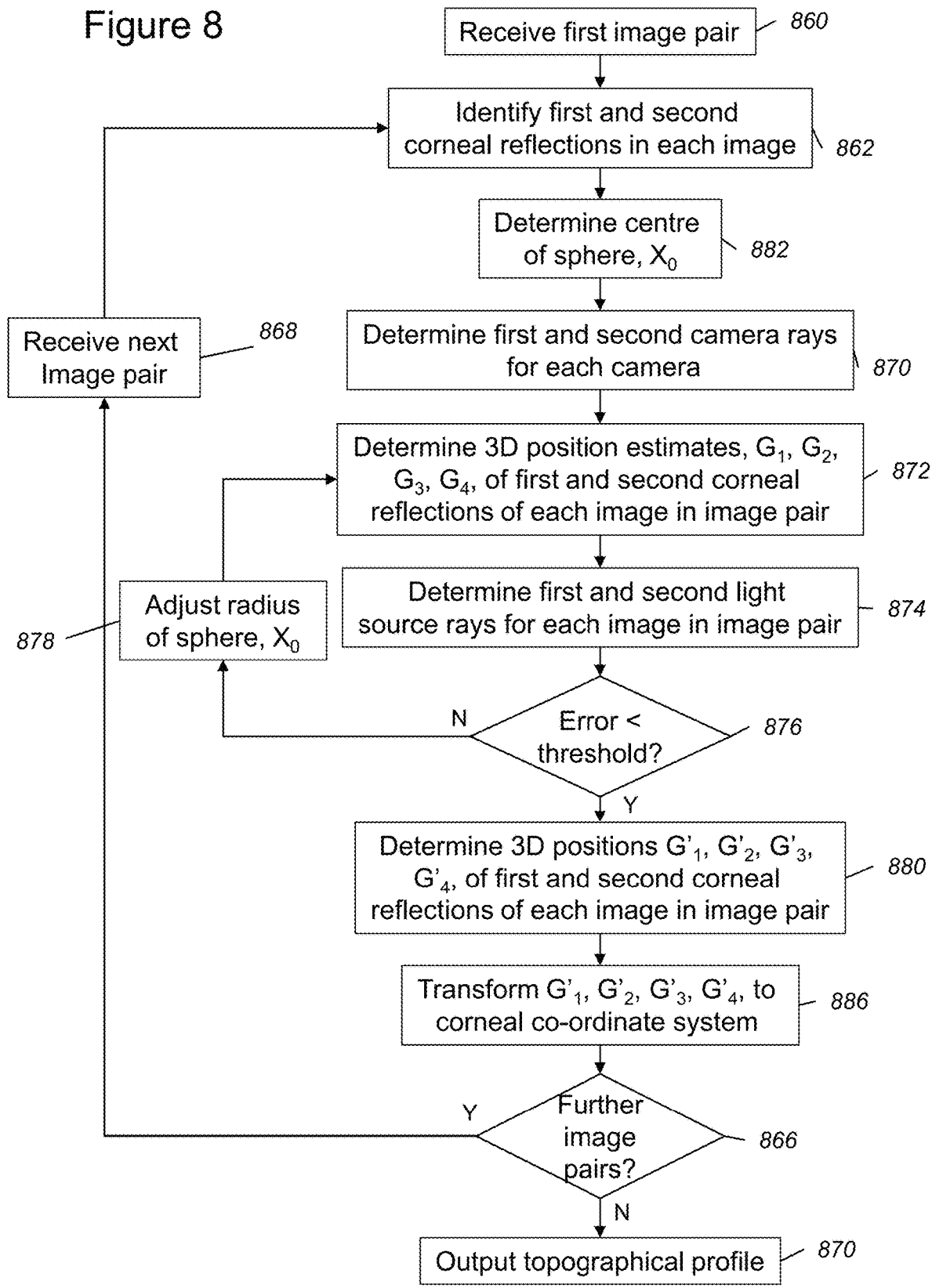
FIG. 8 illustrates a method of determining a topographical corneal profile according to a two camera embodiment of the present disclosure in which the corneal surface model comprises a regional spherical model.

FIG. 8 illustrates a flow diagram for a method of determining a topographical corneal profile according to a two camera embodiment of the present disclosure in which the corneal surface model comprises a regional spherical model. The method will be discussed with continuing reference to the system 740 of FIG. 7.

A first step 860 of the method comprises receiving a first image pair comprising a first image from the first plurality of images (from the first camera 744) and a corresponding first image from the second plurality of images (from the second camera 747). A second step 862 comprises identifying the first and second corneal reflections 748, 749, 750, 751 in each image of the image pair.

A third step 882 comprises determining a centre, $X_0$, of the local sphere of the regional spherical model. It can be assumed that the first and second corneal reflections 748, 749, 750, 751 of each image of the image pair lie on the surface 756 of the local sphere. As a result, the first camera 744, the first corneal reflection 748 of the first image of the image pair, the first light source 752 and the centre, $X_0$, of the local sphere lie on a first plane and the camera 744, the second corneal reflection 750 of the first image of the image pair, the second light source 754 and the centre, $X_0$, of the local sphere lie on a second plane. Therefore, the centre, $X_0$, of the local sphere lies on a first line of intersection of the first plane and the second plane. Furthermore, the first camera 744, the first corneal reflection 749 of the second image of the image pair, the first light source 752 and the centre, $X_0$, of the local sphere lie on a third plane and the camera 744, the second corneal reflection 751 of the second image of the image pair, the second light source 754 and the centre, $X_0$, of the local sphere lie on a fourth plane. Therefore, the centre, $X_0$, of the local sphere lies on a second line of intersection of the third plane and the fourth plane and, more particularly, at the intersection point (or the closest point of intersection) of the first line of intersection and the second line of intersection.

Therefore, the processor 742 may: determine a first plane including the positions of the first camera 744, the first corneal reflection 748 of the first image of the image pair and the first light source 752; determine a second plane including the positions of the first camera 744, the second corneal reflection 750 of the first image of the image pair and the second light source 754; determine a first line of the centre, $X_0$, of the local sphere as the intersection of the first plane and the second plane; determine a third plane including the positions of the second camera 747, the first corneal reflection 748 of the second image of the image pair and the first light source 752; determine a fourth plane including the positions of the second camera 747, the second corneal reflection 750 of the second image of the image pair and the second light source 754; determine a second line of the centre, $X_0$, of the local sphere as the intersection of the third plane and the fourth plane; and determine the centre, $X_0$, of the local sphere as the intersection, or the closest point of intersection, of the first line of the centre, $X_0$, of the local sphere and the second line of the centre, $X_0$, of the local sphere. In some examples, the first line of the centre, $X_0$, of the local sphere and the second line of the centre, $X_0$, of the local sphere may not intersect due to the actual cornea surface in the illuminated sub-region differing from a local sphere. Therefore, the processor 742 may determine the closest point of intersection (the point in space equally between the two lines at their shortest separation) as the centre, $X_0$, of the local sphere.

A fourth step 870 comprises determining first and second camera rays for each camera 744, 747. The processor 742 may determine the first and second camera rays for the first camera 744 by back-projecting (from the first camera 744) the position of the first and second corneal reflections 748, 750 in the first image of the image pair. The processor 742 may determine the first and second camera rays for the second camera 747 by back-projecting (from the second camera 747) the position of the first and second corneal reflections 749, 751 in the second image of the image pair.

A fifth step 872 comprises: determining 3D position estimates, $G_1$, $G_2$, of the first and second corneal reflections 748, 750 of the first image of the image pair as the intersection of the first and second camera rays of the first camera 744 with the surface 756 of the local sphere; and determining 3D position estimates, $G_3$, $G_4$, of the first and second corneal reflections 749, 751 of the second image of the image pair as the intersection of the first and second camera rays of the second camera 747 with the surface 756 of the local sphere.

A sixth step 874 comprises determining the first to fourth light source rays by reflecting the first and second camera rays of each camera 744, 747 from the surface 756 of the local sphere at the respective 3D position estimate, $G_1$, $G_2$, $G_3$, $G_4$ (using the law of reflection), in the same way as described above in relation to FIG. 6 for the single camera example.

A decision point 876 determines whether an error between the first to fourth light source rays and the respective positions of the first and second light sources 752, 754 is less than a threshold value. For example, the processor may determine if a sum of either four shortest distances or four angular deviations corresponding of the first to fourth light source rays is less than a threshold value (as described above for two light source rays). If the error is not less than the threshold value, the method proceeds to step 878 and adjusts the radius of the local sphere before repeating steps 872 to 876. The loop from 872, 874, 876, 878 may be performed as an optimisation algorithm that minimises the error in the four light source rays, as described above. Once the error is less than the threshold value, the method proceeds to seventh step 880 and determines the 3D positions, $G'_1$, $G'_2$, $G'_3$, $G'_4$, of the first and second corneal reflections 748, 749, 750, 751 of each image in the image pair as the (most recent values of) the 3D position estimates, $G_1$, $G_2$, $G_3$, $G_4$.

An eighth step 886 comprises transforming the 3D positions $G'_1$, $G'_2$, $G'_3$, $G'_4$, of the first and second corneal reflections 748, 749, 750, 751 of each image in the image pair, from the system coordinate system to a corneal coordinate system, in the same way as described above in relation to FIG. 6. Transforming 886 the 3D positions $G'_1$, $G'_2$, $G'_3$, $G'_4$, may include determining the optical axis of the eye for the image pair, and determining a transformation matrix using the optical axis, as described above.

A second decision point 866 determines if there are further image pairs in the plurality of images. If there are further image pairs, the method proceeds to step 868 and receives the next image pair of the plurality of images and performs steps 862 to 866 on the next image pair. Once there are no further image pairs, the method proceeds to step 870 and outputs a topographical profile of the cornea based on the 3D positions $G'_1$, $G'_2$, $G'_3$, $G'_4$, of the first and second corneal reflections 748, 749, 750, 751, determined for each image pair.

Figure 9:
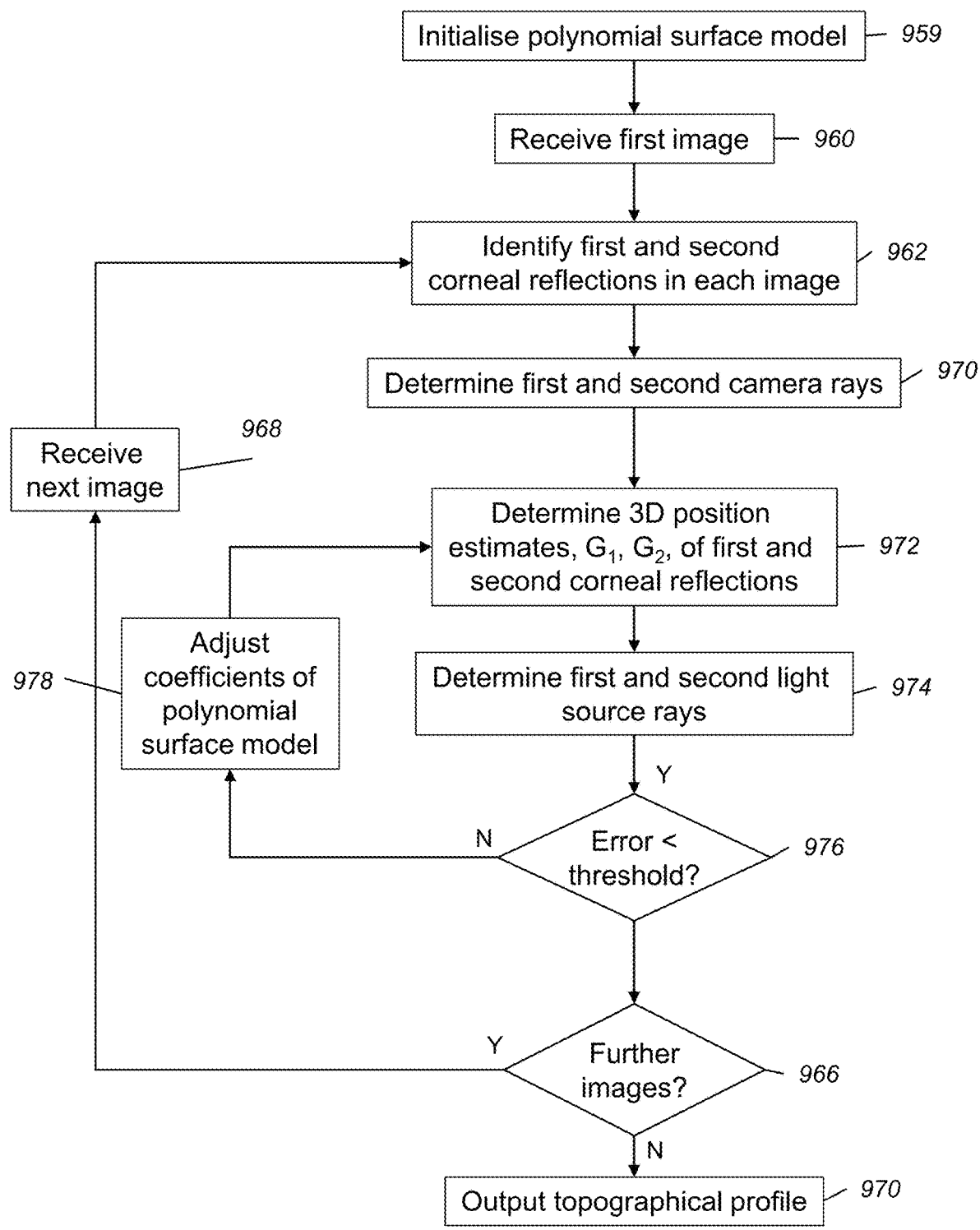
FIG. 9 illustrates a method of determining a topographical corneal profile according to an embodiment of the present disclosure in which the corneal surface model comprises a polynomial surface model of the cornea.

Returning to the one camera examples of FIGS. 3 to 5, in some examples, the corneal surface model for the illuminated sub-region may comprise a polynomial surface model of the (whole) cornea. FIG. 9 illustrates a flow diagram for a method of determining a topographical corneal profile according to an embodiment of the present disclosure in which the corneal surface model comprises a polynomial surface model of the cornea. The method will be discussed with reference to the system 340 of FIG. 3.

A first step 959 comprises initialising the polynomial surface model. In some examples, the polynomial surface model may comprise a Zernike polynomial surface model defined by a plurality of Zernike coefficients. In other examples, the polynomial surface model may comprise a rotationally symmetrical conicoid model, a general polynomial surface or other known polynomial surface models. Initialising the polynomial surface model may comprise receiving a reference polynomial surface. The reference polynomial surface may be based on user population statistics. For example, the reference polynomial surface may represent an average human cornea (average of a plurality of surface profiles corresponding to a population of users). The processor 342 may receive one or more reference polynomial surfaces from a memory (e.g., a local memory of the eye tracking system 340 or a remote library stored on a server). The one or more reference polynomial surfaces may each represent an average cornea surface for a different demographic.

A second step 960 comprises receiving a first image 345 of the plurality of images from the camera 344. A second step 962 comprises identifying the first and second corneal reflections 348, 350 defining the illuminated sub-region of the first image 345. A third step 970 comprises determining the first and second camera rays by back-projecting the position of the first and second corneal reflections 348, 350 in the image 345. A fourth step 972 comprises determining the 3D position estimates, $G_1$, $G_2$, of first and second corneal reflections 348, 350 as the intersection points between a surface of the polynomial surface model and the respective first and second camera rays. A fifth step 974 comprises determining the first and second light source rays by reflecting the first and second camera rays from the surface of the polynomial surface model at the respective 3D position estimate, $G_1$, $G_2$ (using the law of reflection). As part of determining the first and second light source rays, the processor 342 may calculate first and second surface normals to the surface 356 of the polynomial surface model at the respective first and second 3D position estimates $G_1$, $G_2$. The processor 342 may determine each surface normal by calculating the derivative of the surface at the respective 3D position estimate $G_1$, $G_2$. A decision point 976 determines whether an error between the first and second light source rays and the respective positions of the first and second light sources 352, 354 is less than a threshold value (in the same way as described above). If the error is not less than the threshold value, the method proceeds to step 978 and adjusts coefficients (or parameters) of the polynomial surface model before repeating steps 972 to 976. The loop from 972, 974, 976, 978 may be performed as an optimisation algorithm that minimises the error, as described above. Once the error is less than the threshold value, the method proceeds to decision point 966 to determine whether there are further images in the plurality of images. If there are further images, the method proceeds to step 968 and receives the next image in the plurality of images and performs steps 962 to 966 on the next image. Once there are no further images, the method proceeds to step 970 and outputs a topographical profile of the cornea as the polynomial surface model.

The method of FIG. 9 refines the polynomial surface, defining the topographical profile, over time by minimizing the error in the coefficients over several images 345. Advantageously, the polynomial surface model approach does not require the computation of the centre of the local sphere required for the local spherical model. Therefore, in some examples, the polynomial surface model can perform better for eye tracking systems receiving image data from only a single camera.

In some examples, the polynomial surface model may be initialised and defined in the cornea coordinate system. Therefore, the method of claim 9 may comprise calculating the optical axis of the eye for each image and performing one or more coordinate transformations during steps 970 to 974, using the optical axis in the same way as described above for the regional spherical model examples. For example, the processor 342 may transform the polynomial surface from the cornea coordinate system to the system coordinate system to determine the 3D position estimates and the first and second light source rays. Alternatively, the processor 342 may transform the positions of the camera 344 and the first and second light sources 352, 354 from the system coordinate system to the cornea coordinate system using the optical axis and perform all ray tracing calculations in the cornea coordinate system. It will be appreciated that the processor may perform the transformations between coordinate systems at other points. For example, the processor 342 may transform the first and second camera rays to the cornea coordinate system and calculate the 3D position estimates and the light source rays in the cornea coordinate system. The processor 342 may transform the light source rays back to the system coordinate system to calculate the errors in the light source rays. Transforming the positions of the camera and first and second light sources and/or the camera or light source rays can be less computationally intensive than transforming the polynomial surface. Furthermore, by maintaining the polynomial surface model in the cornea coordinate system, the polynomial surface can simply be output as the topographical profile of the cornea.

For examples employing a regional spherical model, the topographical profile of the cornea may consist of a plurality of points (the 3D positions, $G_1$, $G_2$, in cornea coordinates). Once the topographical profile has been generated using all images in the plurality of images, the processor 342, 742 may fit a high-dimensional surface to the topography. For example, the processor 342, 742 may fit a Zernike polynomial surface, a rotationally symmetrical conicoid, a general polynomial surface or other known polynomial surface. As noted above, for the example of FIG. 9, the processor 342 may output the polynomial surface model as the topographical profile following update of the coefficients using one or more images in the plurality of images.

For any of the disclosed eye tracking systems 340, 740 or methods, the processor 342, 742 may output the topographical profile (or the polynomial surface model) to a memory for storage and future reference. The processor may determine, output and store the topographical profile/model during a dedicated calibration routine or while performing eye-tracking on the same or different images. The processor 342, 742 may determine, output and update the stored profile model on a regular basis. For example, the shape of the cornea of an eye can change in the course of a day due to eyelid pressure. The disclosed systems and methods may adjust to varying corneal shapes through the day in a number of ways:

1. The processor 342, 742 may determine the topographical profile/model at various stages throughout the day during normal use of the eye tracking system 340, 740. When sufficient spatial information is gathered of the entire corneal surface, the processor 342, 742 may determine a new topographical profile/model in any of the ways described herein. The processor 342, 742 may compare the newly computed topographical profile/model to the currently stored profile/model. The processor 342, 742 may replace the model based on the comparison, for example if height differences between the models exceed a threshold.
2. A continuous refinement of the corneal model:
    1. During standard operation of the device, the eye tracking system may continuously store positions of corneal reflections in the images.
    2. When a significant number of glint positions N are detected in a fixed patch size P (in square pixels) within a time duration t, in the camera 344 (or either camera 744, 747), the processor 342, 742 may determine new cornea heights (or new coefficients of the polynomial surface model (FIG. 9)) for this patch.
    3. The processor 342, 742 may then replace the cornea heights for the corresponding X, Y positions in the existing model with the new cornea heights (or replace the model coefficients).

The disclosed eye tracking systems may make use of the topographical profile/fitted polynomial surface in a number of ways.

1. Gaze computation: The eye tracking system 340, 740 may use the more accurate cornea surface model to more accurately determine 3D positions of corneal reflections in eye-tracking images. As a result, the eye tracking system 340, 740 can more accurately determine the cornea centre using the more accurate 3D positions, more accurate surface normals at the glint positions and/or knowledge that the cornea centre lies at the origin of the cornea coordinate system. The surface model can also be used to estimate personal parameters of a (simpler) global cornea model which in turn may be used to determine the cornea centre from several glints in a single image frame. The eye tracking system 340, 740 may then compute a more accurate gaze ray using the more accurate cornea centre, for example using the method described in U.S. patent application Ser. No. 10/535,227, which is hereby incorporated by reference in its entirety.
2. Entrance pupil computation: The eye tracking system 340, 740 may compute a stereo entrance pupil more accurately using the more accurate cornea surface model. Determining stereo entrance pupil involves refraction through the cornea, hence knowing the cornea topography reduces the error in stereo entrance pupil computation. The entrance pupil position can then be used as virtual camera positions by XR headset manufacturers to render virtual scenes more realistically.

3. Refining eye model parameters: The eye can be modelled through certain parameters that can be considered unique for individuals, for example pupil plane offset defining the distance between a pupil plane and the cornea centre. The eye tracking can be improved by calibrating these parameters by computing gaze errors when users look in different directions during a calibration sequence. Since gaze computation improves with a better cornea model, the eye tracking system 340, 740 may compute more accurate values of the eye parameters.

The disclosed systems and methods can advantageously provide an accurate topographical profile of a cornea with the use of only one camera and two light sources. Therefore, the cornea topographical modelling can be implemented in eye-tracking systems without requiring new hardware. A second camera can enhance accuracy when implementing a regional spherical model to model the surface of each illuminated sub-region. The cameras and light sources can operate at any suitable wavelength, for example a wavelength invisible to the human eye. In some examples, the camera and light sources may operate at 850 to 940 nm (near-infrared).

Techniques are described for using light source corneal reflections (glints) on a user's eye for cornea anterior surface modelling. The techniques may be performed by an eye tracking system, for example an eye tracking system of a head mounted display. In some examples, the cornea anterior surface may be defined as a topographical profile comprising a height map over a circular region and modelled with Zernike polynomials.

As used herein, the term "sub-region of a corneal surface" defines a part of the corneal surface that is smaller than the entire corneal surface. A dimension of the sub-region, such as a diameter, may be defined by a separation of the first and second corneal reflections 348, 350 in the image 345. The separation of the first and second corneal reflections 348, 350 may be less than a separation threshold, below which a substantially constant surface curvature can be assumed.

As described herein, the 3D positions and 3D position estimates of the corneal reflections, the positions of the camera(s) and the positions of the light sources may comprise 3D positions in a 3D co-ordinate system, such as the system coordinate system or the corneal coordinate system, relative to an origin of the 3D coordinate system. The 3D coordinate system (e.g., cartesian coordinate system or polar coordinate system) may be defined by an origin (such as the corneal centre for the cornea coordinate system, or a position of the camera in the system coordinate system) and corresponding 3D axes. The positions of the camera(s) and/or the positions of the light sources may include a pose of the respective camera/light source indicating an (optical) axis of the respective camera/light source.

As described herein, the position of the corneal reflection in the image relates to a two-dimensional position of the corneal reflections in the (plane of the) image, with reference to an origin of the image (e.g., the top left corner of the image).

Detailed Example

The following provides a detailed example of a two-camera method for determining the topographical profile and results describing the accuracy of the method. The methods may be implemented by any of the eye tracking systems or processors disclosed herein. It will be appreciated that the example is in no way limiting on the scope of the invention which is defined by the appended claims.

General Setting

The goal was to estimate polynomial models describing the corneal surface, given a recording from an eye tracking setup. A recording consisted of frames, images taken from the cameras, and information such as positions for cameras and illuminators (light sources) in world coordinates, and glint positions in image coordinates for each frame. The setup used was with two cameras and ten illuminators per eye. Cameras were located at each side of the eye, one by the nose and one by the ear, and illuminators in a ring formed pattern around them.

Cornea Coordinate System

At each frame, positions for cornea centre c and pupil centre p were known in global coordinates. Origin of the cornea system is cornea centre, and z-axis is the optical axis, with unit vector defined as $$e_z = \frac{p-c}{\|p-c\|}$$

When cornea z-axis is aligned with the global, also x, y-axes are. An assumption made was that the x, y plane does not rotate around z. By these definitions and assumption, directions of coordinate axes in cornea system could be computed as $$e_x = [0, 1, 0]^T \times e_z,$$

$$e_y = e_z \times e_x,$$

where $[0, 1, 0]^T$ represents $e_y$ of the global system, implying that if cornea and world z-axes are aligned, so are also x and y. $e_x$, $e_y$, $e_z$ form the columns of the rotation matrix $R \in \mathbb{R}^{3 \times 3}$ from cornea to global coordinates. The inverse $R^{-1}$ rotates from world to cornea coordinates.

Data Generation

To test the method of reconstructing surface polynomials, synthetic recordings with different corneal surface shapes were generated. The corneal surface used in data generation is modelled by Zernike polynomials of 45 terms. A reference conicoid had been fitted to these Zernike surfaces. The reconstructed surfaces could therefore be compared to ground truth values for R, Q and the first 45 Zernike coefficients.

During one recording, the subject was looking at specified points on the screen, and frames of different gaze directions were obtained. Points on the screen were defined in 4 circles, centred on the screen with different radii, aiming to obtain glints covering as much of the corneal surface as possible. For each recording, 80 points were used, 20 for each of 4 circles. Shapes for generated recordings included One spherical cornea, used for method verification.

5 normal corneas to investigate the stability for small changes.

Method—Local Spheres

Surface points on the cornea were estimated and mapped to the cornea coordinate system. After computing surface points for one recording (or a chosen number of frames), parameters of a chosen surface model polynomial were computed with least squares methods. The approach was to iteratively look at glint pairs (first and second corneal reflection), two illuminators that are next to each other, seen from two cameras. Two illuminators create four glints when seen from two cameras, as seen in FIG. 7. The four glints were estimated to lie on a locally spherical surface (the illuminated sub-region) since the illuminators are close. To estimate the four glints, the centre point and radius of this local sphere needed to be estimated. The first part was done using an approach of plane intersections, and the second part was formulated as a minimization problem. Knowing the local sphere centre and radius, the four estimated surface points could be computed as the intersections between camera rays and the local sphere.

Compute Local Sphere Centre

Figure 10:
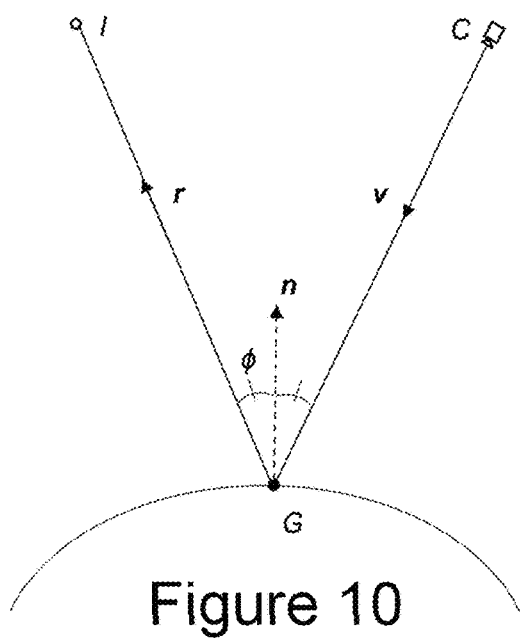
FIG. 10 illustrates reflection of light from an illuminator about a surface normal.

From camera images, 2D image coordinates of glints were converted to 3D rays using back projection. The law of reflection implies that the light ray from an illuminator, its reflection and surface normal at point of reflection all lie in the same plane. This is illustrated in FIG. 10, where r is light from an illuminator reflecting at point G on the surface. n is the surface normal at point G, and the angle φ between n and r is the same as between n and v. v is the back projected camera ray.

For two cameras and two illuminators, four planes were defined. The normal u of each plane could be computed as $$u = v \times w, \quad w = \frac{I - C}{\|I - C\|}$$

where w is the directional vector between a camera C and an illuminator I, and v the directional vector from camera to glint. Looking first at one camera $C_1$ and two illuminators $I_1$, $I_2$, two planes with normals $u_1$, $u_2$ were defined. The line of intersection between these two planes is a line with direction orthogonal to both plane normals, $$s_1 = \frac{u_1 \times u_2}{\|u_1 \times u_2\|}$$

This line is expressed on parametric form as $l_1 = C_1 + t_1 s_1$. Same computations for the second camera $C_2$ with $I_1$ and $I_2$ resulted in another plane intersection line $l_2 = C_2 + t_2 s_2$. The local sphere centre $X_0$ was estimated to be the closest point of intersection between lines $l_1$, $l_2$. To be noted is that for a spherical cornea, the point of intersection between these lines would theoretically be the true cornea centre.

Computing Local Sphere Radius

Given an initial guess of the local sphere centre $X_0$, both $X_0$ and the radius r were optimised by minimization of an error term. The error was formulated as a sum of four angles, one for each glint, and computed with the objective function.

Objective Function

For a local sphere with centre $X_0$ and radius r, four points of intersection between sphere and camera rays were computed to determine the 3D position estimates. The points were denoted $G_{j,k}$, j, k=1, 2, for corresponding illuminator $I_j$ and camera $C_k$. For each point, a surface normal n was computed for the local sphere as $$n = \frac{G - X_0}{\|G - X_0\|} \quad 1.1$$

These normals are not exactly the true surface normals but are good approximations. Knowing the normals n and camera rays v for each point, the reflected rays r (or light source rays) were computed using the reflection formula, $$r = \frac{v - 2(v \cdot n)n}{\|v - 2(v \cdot n)n\|} \quad 1.2$$

Example light source rays are illustrated in FIGS. 3 and 7. In FIG. 3, the computed light source ray r deviates from the ray q going to the illuminator $I_1$, $I_2$. q was computed as $$q = \frac{I_j - G}{\|I_j - G\|} \quad 1.3$$

The error was computed as $$\alpha = \Sigma_{j,k=1,2} |\alpha_{j,k}|, \quad \alpha_{j,k} = \cos^{-1}(r_{k,k} \cdot q_{j,k}) \quad 1.4$$

Optimization of local sphere centre $X_0$ and radius r, was done using Broyden-Fletcher-Goldfarb-Shanno (BFGS) method. The computed local sphere centre, $X_0$, was then used as an initial guess and allowed to small changes. Once the optimal parameters were found, estimated 3D glints were computed as points of intersection between local sphere and camera rays and transformed to cornea coordinates. The publicly available python function optimize.minimize(method='BFGS') from the scipy library can be used in implementation.

Model Estimation

With n 3D positions of glints with coordinates $(x_i, y_i, z_i)$, i=1, ..., n, in cornea coordinate system, different polynomial surfaces (rotationally symmetric conicoid and Zernike polynomial) were estimated to fit the points. Points were converted to cylindrical coordinates by $$r_i = \sqrt{x_i^2 + y_i^2}, \quad \theta_i = \frac{z}{r}$$

forming $r=(r_1, \ldots, r_n)$, $\theta=(\theta_1, \ldots, \theta_n)$. Finding the optimal parameters $\beta^*$ for an estimated surface polynomial, expressed as $z^{est}=f(r, \theta, \beta)$, could be formulated as a least squares problem $$\min_{\beta} \|(f(r, \theta, \beta) - z)\|_2^2,$$

where the 2-norm is defined as $\|x\|_2 := \sqrt{(x_1^2 + \ldots + x_n^2)}$. Two polynomials are explained in this example, a rotationally symmetric conicoid and a sum of Zernike polynomials. A rotationally symmetric conicoid can be expressed as $$r^2 + (1+Q)z^2 + 2zR = 0$$

This can be rewritten into z=f(r, R, Q), with parameters $\beta=(R, Q)$ $$f(r, \beta) = \frac{1}{1+Q}\left(\sqrt{R^2 - (1+Q)r^2} - R\right)$$

Square root with negative sign was not considered since the cornea is only located at positive z-values. A finite series of Zernike polynomials can be written $$f(r, \theta, \beta) = \sum_{i=0}^{p-1} c_i Z_i(r, \theta)$$

where $\beta = c_0, \ldots, c_{p-1}$ are referred to as the Zernike coefficients.

Levenberg Marquardt algorithm, also known as damped least squares can be used to minimize these nonlinear least squares problem. The publicly available python function optimize.least_squares(method='lm') from the scipy library can be used in implementation.

Accuracy of Estimation

The estimated surface height was compared with ground truth by defining a grid in (r, θ) space and comparing the estimated z values to the true values. For a set of $n^2$ points $(r_i, \theta_k)$, $i=1, \ldots, n$, $k=1, \ldots, n$, heights $z_{i,k}$ were computed as $z_{i,k} = f(r_i, \theta_k)$. The surface height error $\varepsilon_z$ was formulated as $$\varepsilon_z = \sqrt{\frac{1}{n^2}\Sigma_{i=1}^{n}\Sigma_{k=1}^{n}\left(z_{i,k}^{est} - z_{i,k}^{true}\right)^2}$$

Also, a surface curvature error $\varepsilon_n$ was defined by comparing angles between true and estimated surface normal, $$\varepsilon_n = \sqrt{\frac{1}{n^2}\Sigma_{i=1}^{n}\Sigma_{k=1}^{n}\left(\cos^{-1}\left(n_{i,k}^{est} \cdot n_{i,k}^{true}\right)\right)^2}$$

The errors were computed inside a circle with radius r=3.25 and n=256.

The described method can be summarized as the following steps:

1, For each frame and glint pair:
  1.1 Compute initial local sphere centre $x_0$.
  1.2 Find optimised local sphere centre $x_0$ and radius r by minimising the error α, computed by objective function equations 1.1-1.4.
  1.3 Compute surface points as intersections between local sphere and camera rays.
  1.4 Transform points to cornea coordinates.
2, Estimate parameters β for a surface polynomial that best fits the surface points.
3, Compare estimated surface polynomial to ground truth.

Method 2—Optimising Surface Parameters Directly

In this method, no local spheres were used. Instead, positions for camera(s) and illuminators, and directions of rays from cameras to glints were transformed to cornea coordinates for all frames and stored. Optimisation or refinement of surface polynomial parameters could then be made after a chosen number of frames, possibly all frames in the recording, using the same objective function as described above, with the difference of now using the normals of the initiated surface and not the local spheres. The method can be implemented as follows.

1, Initiate a surface polynomial with parameters β, f(r, θ, β).
2, For all frames in the recording, transform coordinates for camera(s) and illuminators to cornea coordinates. Transform also the rays from camera to all glints. Store these in three lists of equal size, one list element per identified glint.
3, Find optimised parameters β by minimising the errors α, using e.g. the BFGS-method explained above. For each unique set of camera, illuminator and glint,
  3.1, Compute point of intersection G between surface, described by f(r, θ, β), and ray from camera v.
  3.2, Compute true surface normal n at point G.
  3.3, Compute reflected ray r as in equation 1.2.
  3.4, Compute true ray to illuminator q as in equation 1.3.
  3.5, Compute error α as in equation 1.4, $\alpha = \cos^{-1}(r \cdot q)$ and store this.

Experimental Results for a Spherical Cornea

Presented results were obtained for the local sphere method.

TABLE 1

Estimated parameters for a sphere and conicoid for a spherical cornea. Ground truth values were R = 7.905, Q = 0.

| | |
|---|---|
| Sphere, est. R | 7.905 (7.9048) |
| Conicoid, est. R, Q | 7.903, 0.150 |

TABLE 2

Estimated and true symmetric Zernike coefficients.

| | $C_0$ | $C_4$ | $C_{12}$ | $C_{24}$ | $C_{40}$ |
|---|---|---|---|---|---|
| True | 7.561 | $-2.02 \cdot 10^{-1}$ | $-2.41 \cdot 10^{-3}$ | $-5.59 \cdot 10^{-5}$ | $-2.02 \cdot 10^{-6}$ |
| Est. | 7.567 | $-1.99 \cdot 10^{-1}$ | $-1.23 \cdot 10^{-3}$ | $-2.45 \cdot 10^{-4}$ | $-2.96 \cdot 10^{-6}$ |

Figure 13:
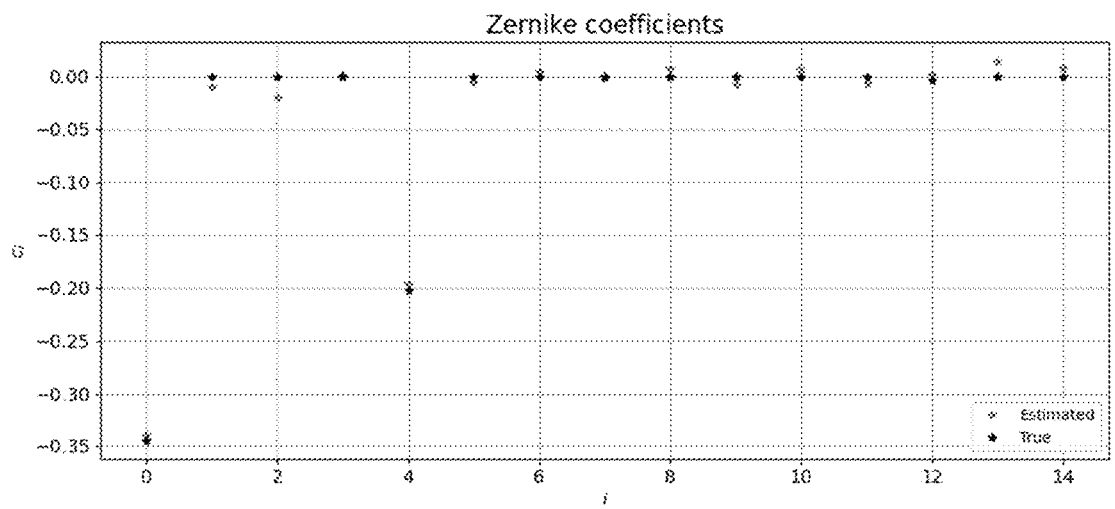
FIG. 13 illustrates the accuracy of calculated Zernike coefficients versus true coefficients of the original data.
Figure 14:
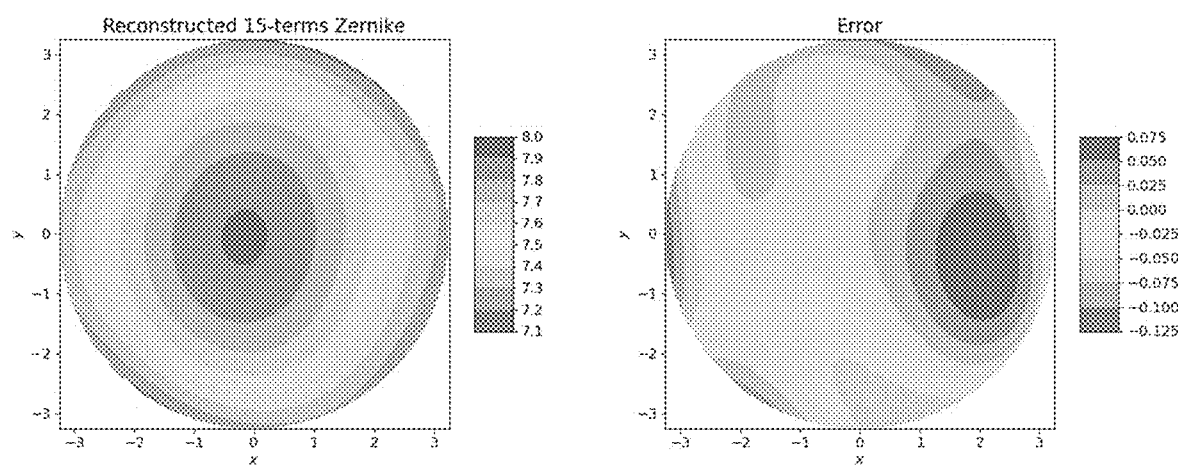
FIG. 14 illustrates a topographical profile of a cornea and the error in the reconstructed data from a ground truth.

Estimated first 15 Zernike coefficients can be seen in FIG. 13, and the surface with error in FIG. 14.

Results for Normal Cornea

Figure 11:
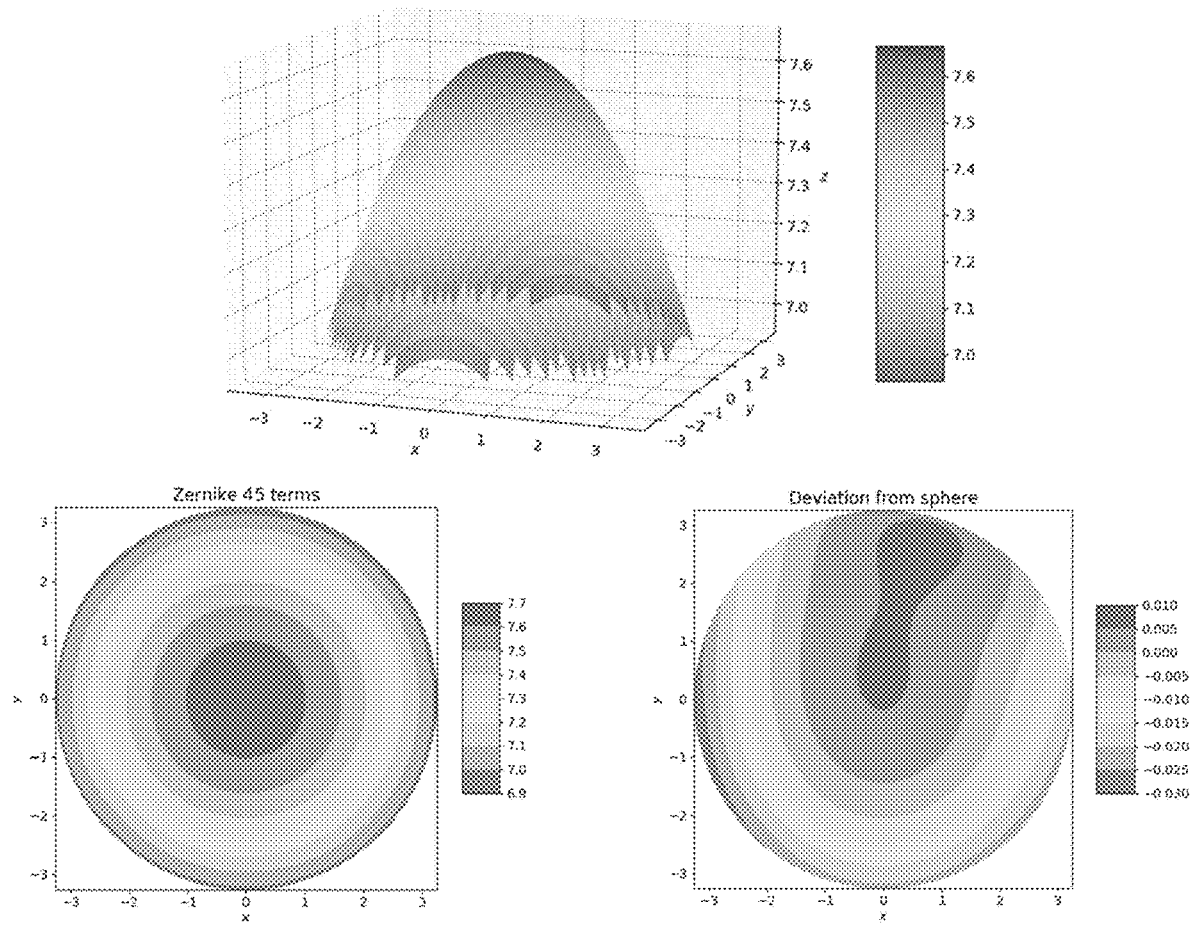
FIG. 11 illustrates an example cornea generated with 45 Zernike coefficients based on statistical properties.
Figure 12:
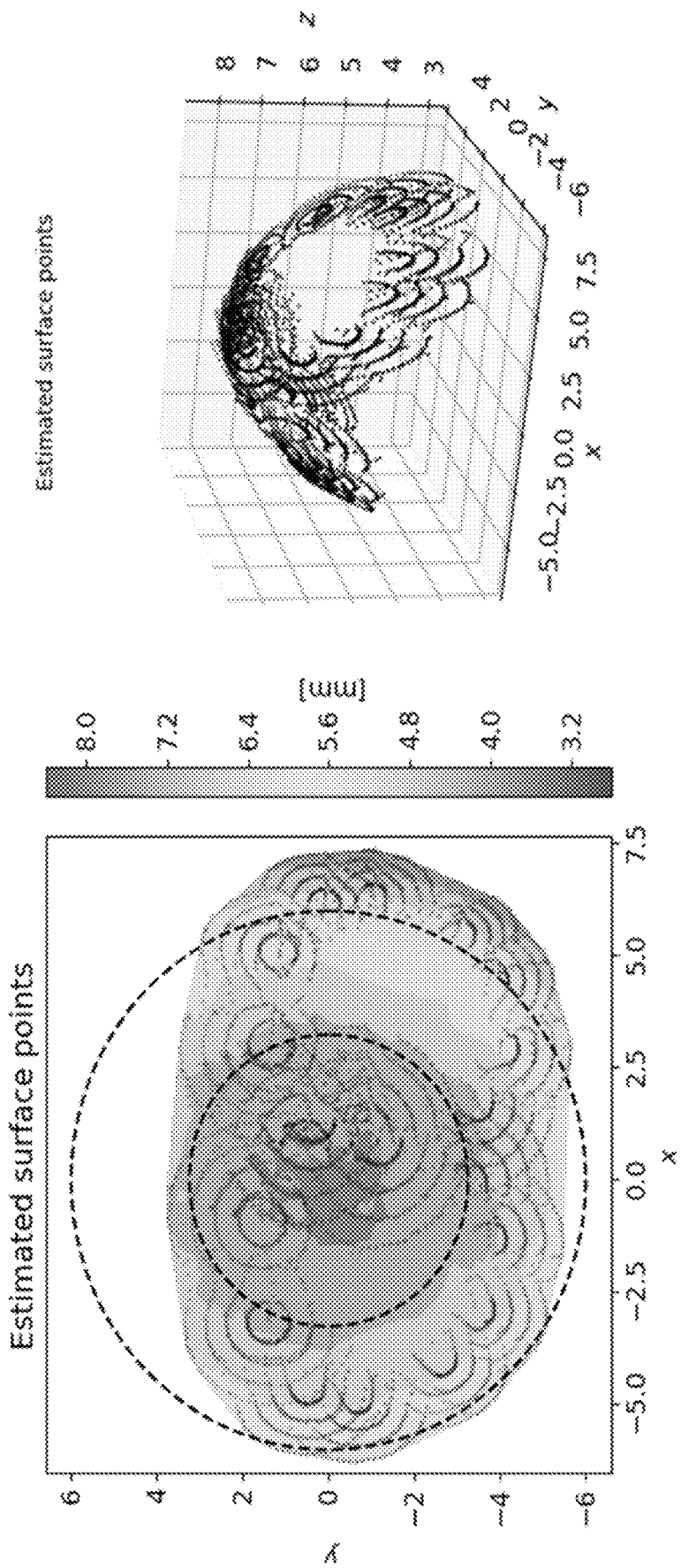
FIG. 12 illustrates a topographical profile of a cornea.

Synthetic corneas were generated based on mean statistics. An example of a generated synthetic cornea can be seen in FIG. 11. Estimated surface points for one of these recordings are seen in FIG. 12. Results are here presented with mean±standard deviation for 5 recordings.

TABLE 3

Errors for apical radius R and asphericity Q for a rotationally symmetric conicoid. Negative Q indicates that the mean estimated value was lower than the true. Positive R indicates that the mean estimated value was higher than the true.

| | |
|---|---|
| R [mm] | 0.06 ± 0.03 |
| Q | −0.20 ± 0.90 |

TABLE 4

Surface height and curvature errors for rotationally symmetric conicoid and Zernike with different number of terms.

| | Conicoid | Zernike 6 | Zernike 15 | Zernike 45 |
|---|---|---|---|---|
| $\varepsilon_z$ [mm] | 0.07 ± 0.03 | 0.09 ± 0.04 | 0.09 ± 0.04 | 0.10 ± 0.04 |
| $\varepsilon_n$ [rad] | 0.03 ± 0.02 | 0.09 ± 0.05 | 0.13 ± 0.04 | 0.31 ± 0.06 |

Throughout the present specification, the descriptors relating to relative orientation and position, such as "horizontal", "vertical", "top", "bottom" and "side", are used in the sense of the orientation of the eye tracking system as presented in the drawings. However, such descriptors are not intended to be in any way limiting to an intended use of the described or claimed invention.

It will be appreciated that any reference to "close to", "before", "shortly before", "after" "shortly after", "higher than", or "lower than", etc, can refer to the parameter in question being less than or greater than a threshold value, or between two threshold values, depending upon the context.

The invention claimed is:

1. An eye tracking system comprising a processor configured to:
receive a plurality of images of an eye from at least one camera, each image comprising a different illuminated sub-region of a corneal surface of the eye, the illuminated sub-region comprising:
a first corneal reflection of a first light source from the illuminated sub-region; and
a second corneal reflection of a second light source from the illuminated sub-region;
for each image, determine a three-dimensional, 3D, position of the first corneal reflection and a 3D position of the second corneal reflection based on a position of the at least one camera, a position of the first light source, a position of the second light source, positions of the first and second corneal reflections in the image and a corneal surface model for the illuminated sub region; by adjusting the corneal surface model to reduce an error:
in a ray tracing path from the camera to the first light source via the first corneal reflection projected on a surface of the corneal surface model; and
in a ray tracing path from the camera to the second light source via the second corneal reflection projected on the surface of the corneal surface model, wherein the corneal surface model for the illuminated sub region of each image comprises a regional spherical model of the illuminated sub-region and wherein the processor is configured to:
for each image, adjust the corneal surface model by adjusting a radius and/or a centre of a sphere of the regional spherical model;
wherein the processor is configured to:
for each image:
estimate an optical axis of the eye in the image;
transform the 3D position of the first corneal reflection and the 3D position of the second corneal reflection from a system coordinate system to a cornea coordinate system using the optical axis; and
determine a first corneal height and a second corneal height corresponding to the 3D position of the respective first and second corneal reflections in the cornea coordinate system; and
output the topographical profile of the cornea as a height map comprising the first corneal height and the second corneal height of each image.

2. The eye tracking system of claim 1, wherein the processor is configured to:
for each image, estimate an optical axis of the eye in the image; and
output the topographical profile of the cornea based on the 3D positions of the first corneal reflection and the second corneal reflection, and the optical axis, determined for each image.

3. The eye tracking system of claim 1, wherein the processor is configured to:
for each image:
determine at least one first camera ray from the position of the respective at least one camera to the 3D position of the first corneal reflection by back-projecting the position of the first corneal reflection in the image;
determine at least one second camera ray from the position of the respective at least one camera to the 3D position of the second corneal reflection by back-projecting the position of the second corneal reflection in the image;
determine at least one first light source ray and at least one second light source ray based on a corresponding reflection of the at least one first camera ray and the at least one second camera ray from a surface of the corneal surface model;
adjust the corneal surface model to reduce an error between:
a direction of the at least one first light source ray and the position of the first light source; and
a direction of the at least one second light source ray and the position of the second light source; and
determine the 3D position of the first corneal reflection and the 3D position of the second corneal reflection based on the adjusted corneal surface model.

4. The eye tracking system of claim 1, wherein the error comprises:
a displacement error representing a displacement of a first light source ray from a position of the first light source and a displacement of a second light source ray from a position of the second light source; or
an angular error representing an angular error in the first light source ray and an angular error in the second light source ray.

5. The eye tracking system of claim 1, wherein the processor is configured to adjust the corneal surface model until the error satisfies a threshold condition.

6. The eye tracking system of claim 5, wherein the processor is configured to, for each image:
estimate an optical axis of the eye in the image; and
determine the 3D position of the first corneal reflection and the 3D position of the second corneal reflection in a corneal coordinate system using the optical axis.

7. The eye tracking system of claim 1, wherein the corneal surface model for the illuminated sub region comprises a polynomial surface model of the cornea and wherein the processor is configured to:
for each image, adjust the corneal surface model by updating coefficients of the polynomial surface model of the cornea; and
output the topographical profile of the cornea as the polynomial surface model.

8. The eye tracking system of claim 7, wherein the polynomial surface model comprises a Zernike polynomial.

9. The eye tracking system of claim 1, wherein the processor is configured to determine the optical axis using a pupil centre corneal reflection algorithm.

10. The eye tracking system of claim 1, wherein:
the processor is configured to receive the plurality of images as a first plurality of images from a first camera and a corresponding second plurality of images from a second camera spaced apart from the first camera, wherein each image in the first plurality of images and a corresponding image in the second plurality of images define an image pair capturing the same gaze angle of the eye; and
the illuminated sub region of each image comprises a region encompassing the first and second corneal reflections of each image in the respective image pair.

11. The eye tracking system of claim 10, wherein the processor is configured to: determine a first plane including the positions of the first camera, the first corneal reflection of the first image of the image pair and the first light source; determine a second plane including the positions of the first camera, the second corneal reflection of the first image of the image pair and the second light source; determine a first line of the centre of the local sphere as the intersection of the first plane and the second plane; determine a third plane including the positions of the second camera, the first corneal reflection of the second image of the image pair and the first light source; determine a fourth plane including the positions of the second camera, the second corneal reflection of the second image of the image pair and the second light source; determine a second line of the centre of the local sphere as the intersection of the third plane and the fourth plane; and determine the centre of the local sphere as the intersection, or the closest point of intersection, of the first line of the centre of the local sphere and the second line of the centre of the local sphere.

12. The eye tracking system of claim 1, wherein the plurality of images comprise images of the eye having a range of different gaze directions or gaze angles.

13. The eye tracking system of claim 1, wherein the eye tracking system is configured to provide instructions to a user to gaze in different directions while capturing the plurality of images.

14. The eye tracking system of claim 1, wherein the eye tracking system is configured to instruct a user to follow stimulus on a display.

15. The eye tracking system of claim 14, wherein the eye tracking system comprises the display and wherein the processor is configured to output instructions as visual or audio signals via one or more signal generators.

16. The eye tracking system of claim 1, wherein the eye tracking system is configured to:
  receive a further image of the eye, the further image of the eye comprising a plurality of corneal reflections corresponding to a plurality of light sources;
  determine the 3D positions of the plurality of corneal reflections using the topographical profile of the cornea;
  determine a corneal centre based on the 3D positions of the plurality of corneal reflections; and
  determine a gaze of the eye based on the corneal centre.

17. A device is adapted to be mounted on a head of a user, the device comprising the eye tracking system of claim 1.

18. A method for generating a topographical profile of an eye, the method comprising:
  receiving a plurality of images of an eye from at least one camera, each image comprising a different illuminated sub-region of a corneal surface of the eye, the illuminated sub-region comprising:
    a first corneal reflection of a first light source from the illuminated sub-region; and
    a second corneal reflection of a second light source from the illuminated sub-region;
  for each image, determining a three-dimensional, 3D, position of the first corneal reflection and a 3D position of the second corneal reflection based on a position of the at least one camera, a position of the first light source, a position of the second light source, positions of the first and second corneal reflections in the image and a corneal surface model for the illuminated sub region; by adjusting the corneal surface model to reduce an error:
  in a ray tracing path from the camera to the first light source via the first corneal reflection projected on a surface of the corneal surface model; and
  in a ray tracing path from the camera to the second light source via the second corneal reflection projected on the surface of the corneal surface model, wherein the corneal surface model for the illuminated sub region of each image comprises a regional spherical model of the illuminated sub-region and wherein the processor is configured to:
  for each image, adjust the corneal surface model by adjusting a radius and/or a centre of a sphere of the regional spherical model;
  wherein the processor is configured to:
  for each image:
    estimate an optical axis of the eye in the image;
    transform the 3D position of the first corneal reflection and the 3D position of the second corneal reflection from a system coordinate system to a cornea coordinate system using the optical axis; and
    determine a first corneal height and a second corneal height corresponding to the 3D position of the respective first and second corneal reflections in the cornea coordinate system; and
    output the topographical profile of the cornea as a height map comprising the first corneal height and the second corneal height of each image.

* * * * *